US012585084B2

(12) United States Patent
Yu et al.

(10) Patent No.: US 12,585,084 B2
(45) Date of Patent: Mar. 24, 2026

(54) OPTICAL CAMERA LENS

(71) Applicant: AAC Optics (Suzhou) Co., Ltd., Suzhou (CN)

(72) Inventors: Renlong Yu, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 331 days.

(21) Appl. No.: 18/544,375

(22) Filed: Dec. 18, 2023

(65) Prior Publication Data

US 2024/0411106 A1    Dec. 12, 2024

(30) Foreign Application Priority Data

Jun. 7, 2023    (CN) ......................... 202310668286.X

(51) Int. Cl.
*G02B 9/62*      (2006.01)
*G02B 13/00*    (2006.01)

(52) U.S. Cl.
CPC ........... *G02B 9/62* (2013.01); *G02B 13/0045* (2013.01)

(58) Field of Classification Search
CPC .............................. G02B 9/62; G02B 13/0045
See application file for complete search history.

(56) References Cited

FOREIGN PATENT DOCUMENTS

| CN | 110412730 A | * | 11/2019 | ......... G02B 13/0045 |
| CN | 114594568 A | * | 6/2022 | ............. G02B 13/18 |

* cited by examiner

*Primary Examiner* — Alexander P Gross
(74) *Attorney, Agent, or Firm* — Wiersch Law Group

(57)    ABSTRACT

The present application relates to the field of optical lenses and discloses an optical camera lens including, in order from an objective side to an image side: a first lens having a negative refractive force, a second lens having a negative refractive force, a third lens having a positive refractive force, a fourth lens having a positive refractive force, a fifth lens having a negative refractive force, and a sixth lens having a positive refractive force. The following relationship expressions are satisfied: 1.70≤n1≤2.20; −2.30≤f2/f≤−1.60; −1.80≤R11/R12≤−0.50; 0.10≤f3/f4≤0.50; 8.00≤d5/d6≤30.00. The optical camera lens provided by the present application has excellent optical performance while satisfying the design requirements of large aperture and ultra-wide angle.

12 Claims, 18 Drawing Sheets

10

Axial Aberration

Millimeter

Magnification Chromatic Aberration

Micron

20

Axial Aberration

Magnification Chromatic Aberration

Axial Aberration

Millimeter

Magnification Chromatic Aberration

Micron

Axial Aberration

Millimeter

Magnification Chromatic Aberration

Micron

OPTICAL CAMERA LENS

TECHNICAL FIELD

The present application relates to the field of optical lenses, in particular to an optical camera lens applicable to handheld smart devices such as smartphones and digital cameras, as well as camera devices such as monitors, PC lenses, and in-vehicle camera lenses.

BACKGROUND

In recent years, with the rise of smart devices, there has been an increasing demand for small-sized camera lenses. Typically, imaging devices for camera lenses are limited to Charge Coupled Devices (CCD) or Complementary Metal-Oxide Semiconductor Sensor (CMOS Sensor). Due to advancements in semiconductor manufacturing technology, the pixel size of imaging devices has decreased. Moreover, current trends in smart devices favor functionality, as well as a slim and compact design. Consequently, small-sized camera lenses that offer excellent imaging quality have become the mainstream in the current market.

To achieve better imaging quality, conventional lenses integrated into smartphone cameras often adopt a three-element, four-element, or even five-element lens structure. However, with technological advancements and the increasing diversification of user needs, as the pixel area of imaging devices continues to shrink and the system's requirements for imaging quality rise, the six-element lens structure has gradually emerged in lens design. Although common six-element lens structures already exhibit excellent optical performance, their optical focal length, lens spacing, and lens shape settings may still have certain shortcomings. This can result in a lens structure that, while possessing excellent optical performance, fails to satisfy the design requirements for large apertures and ultra-wide angles.

SUMMARY

In response to the above problem, an object of the present application is to provide an optical camera lens that has excellent optical performance while satisfying the design requirements of large aperture and ultra-wide angle.

In order to solve the above technical problems, an embodiment of the present application provides an optical camera lens, comprising, in order from an objective side to an image side:

a first lens having a negative refractive force;
a second lens having a negative refractive force;
a third lens having a positive refractive force;
a fourth lens having a positive refractive force;
a fifth lens having a negative refractive force; and a sixth lens having a positive refractive force;
wherein a refractive index of the first lens is $n1$; a focal length of the optical camera lens is $f$; a focal length of the second lens is $f2$; a focal length of the third lens is $f3$; a focal length of the fourth lens is $f4$; a central radius of curvature of an objective surface of the sixth lens is $R11$; a central radius of curvature of an image surface of the sixth lens is $R12$; an on-axis thickness of the third lens is $d5$; an on-axis distance from an image surface of the third lens to an objective surface of the fourth lens is $d6$, and the following relationship expressions are satisfied:

$$1.70 \le n1 \le 2.20;$$

$$-2.30 \le f2/f \le -1.60;$$

$$-1.80 \le R11/R12 \le -0.50;$$

$$0.10 \le f3/f4 \le 0.50;$$

$$8.00 \le d5/d6 \le 30.00.$$

In one embodiment, a combined focal length of the fourth lens and the fifth lens is $f45$; an on-axis thickness of the fourth lens is $d7$; an on-axis distance from an image surface of the fourth lens to an objective surface of the fifth lens is $d8$; an on-axis thickness of the fifth lens is $d9$, and the following relationship expression is satisfied:

$$-20.00 \le f45/(d7 + d8 + d9) \le -4.00.$$

In one embodiment, a refractive index of the third lens is $n3$, and the following relationship expression is satisfied:

$$1.70 \le n3 \le 2.20.$$

In one embodiment, an objective surface of the first lens is convex at a proximal-axis position, and an image surface of the first lens is concave at a proximal-axis position;

a total track length of the optical camera lens is TTL; a focal length of the first lens is $f1$; a central radius of curvature of the objective surface of the first lens is $R1$; a central radius of curvature of the image surface of the first lens of $R2$; an on-axis thickness of the first lens is $d1$, and the following relationship expressions are satisfied:

$$-11.38 \le f1/f \le -2.62;$$

$$0.83 \le (R1 + R2)/(R1 - R2) \le 2.81;$$

$$0.03 \le d1/TTL \le 0.29.$$

In one embodiment, an objective surface of the second lens is concave at a proximal-axis position, and an image surface of the second lens is concave at a proximal-axis position;

a total track length of the optical camera lens is TTL; a central radius of curvature of the objective surface of the second lens of $R3$; a central radius of curvature of the image surface of the second lens of $R4$; an on-axis thickness of the second lens is $d3$, and the following relationship expressions are satisfied:

$$0.04 \le (R3 + R4)/(R3 - R4) \le 0.92;$$

$$0.02 \le d3/TTL \le 0.08.$$

In one embodiment, a total track length of the optical camera lens is TTL; an objective surface of the third lens is convex at a proximal-axis position, and the image surface of the third lens is convex at a proximal-axis position;

a central radius of curvature of the objective surface of the third lens is R5; a central radius of curvature of the image surface of the third lens is R6, and the following relationship expressions are satisfied:

$$1.11 \leq f3/f \leq 6.09;$$

$$-0.69 \leq (R5 + R6)/(R5 - R6) \leq -0.17;$$

$$0.09 \leq d5/TTL \leq 0.37.$$

In one embodiment, the objective surface of the fourth lens is convex at a proximal-axis position, and an image surface of the fourth lens is convex at a proximal-axis position;

a total track length of the optical camera lens is TTL; a central radius of curvature of the objective surface of the fourth lens is R7; a central radius of curvature of the image surface of the fourth lens is R8; an on-axis thickness of the fourth lens is d7, and the following relationship expressions are satisfied:

$$2.71 \leq f4/f \leq 32.42;$$

$$-0.40 \leq (R7 + R8)/(R7 - R8) \leq 0.58;$$

$$0.02 \leq d7/TTL \leq 0.13.$$

In one embodiment, an objective surface of the fifth lens is concave at a proximal-axis position, and an image surface of the fifth lens is concave at a proximal-axis position;

a total track length of the optical camera lens is TTL; a focal length of the fifth lens is f5; a central radius of curvature of the objective surface of the fifth lens of R9; a central radius of curvature of the image surface of the fifth lens of R10; an on-axis thickness of the fifth lens is d9, and the following relationship expressions are satisfied:

$$-9.35 \leq f5/f \leq -1.54;$$

$$-0.74 \leq (R9 + R10)/(R9 - R10) \leq 0.31;$$

$$0.01 \leq d9/TTL \leq 0.06.$$

In one embodiment, the objective surface of the sixth lens is convex at a proximal-axis position, and the image surface of the sixth lens is convex at a proximal-axis position;

a total track length of the optical camera lens is TTL; a focal length of the sixth lens is f6; an on-axis thickness of the sixth lens is d11, and the following relationship expressions are satisfied:

$$0.99 \leq f6/f \leq 3.98;$$

$$0.04 \leq d11/TTL \leq 0.21.$$

In one embodiment, an aperture value of the optical camera lens is Fno; a field of view of the optical camera lens is FOV, and the following relationship expressions are satisfied:

$$Fno \leq 2.00;$$

$$FOV \geq 196.00°.$$

In one embodiment, the first lens is made of glass material.

In one embodiment, the third lens is made of glass material.

The beneficial effect of the present application lies in that by limiting the refractive index of the first lens, the ratio of the focal length of the second lens to the focal length of the optical camera lens, the central radius of curvature of the objective surface of the sixth lens and the central radius of curvature of the image surface of the sixth lens, the ratio of the focal length of the third lens to the focal length of the fourth lens, as well as the ratio of the on-axis thickness of the third lens and the on-axis distance from the image surface of the third lens to the objective surface of the fourth lens, the optical camera lens is enabled to have excellent optical performance and exhibits large aperture and ultra-wide angle characteristics, which is particularly suitable for mobile phone camera lens assemblies, Web camera lenses, and in-vehicle camera lenses consisting of high-pixel CCD, CMOS, and other camera elements.

BRIEF DESCRIPTION OF THE DRAWINGS

In order to more clearly illustrate the technical solutions in the embodiments of the present application, the following will briefly introduce the accompanying drawings that need to be used in the description of the embodiments, and it will be obvious that the accompanying drawings in the following description are only some of the embodiments of the present application, and for the person of ordinary skill in the field, other accompanying drawings can be obtained based on these drawings without creative labor, wherein.

DETAILED DESCRIPTION OF THE EMBODIMENTS

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

First Embodiment

Figure 1:
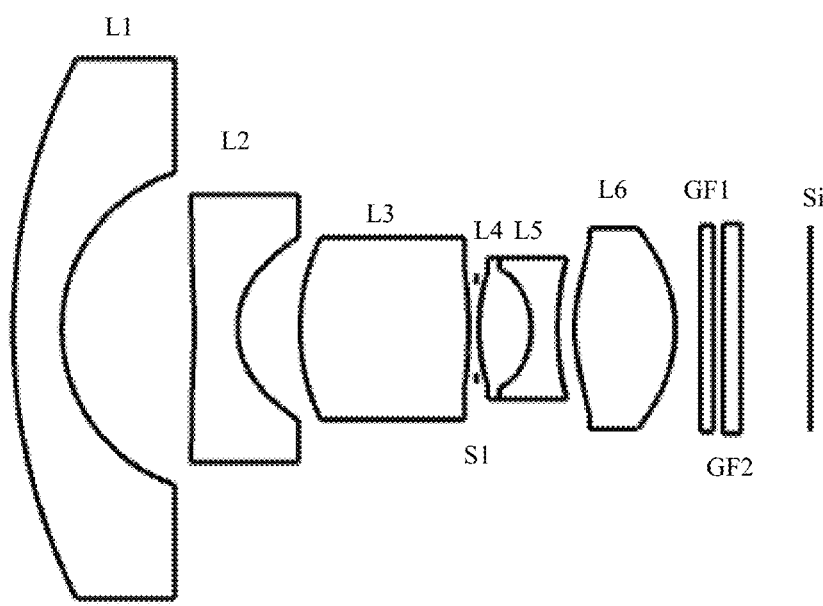
FIG. 1 is a structural schematic diagram of an optical camera lens according to the first embodiment of the present application.

As shown in the accompanying drawings, the present application provides an optical camera lens 10. FIG. 1 shows an optical camera lens 10 according to the first embodiment of the present application, and the optical camera lens 10 includes six lenses. Specifically, the optical camera lens 10, in order from an objective side to an image side, includes a first lens L1, a second lens L2, a third lens L3, an aperture S1, a fourth lens L4, a fifth lens L5, a sixth lens L6, and an image surface Si. An optical element such as a first optical filter GF1 and a second optical filter GF2 may be provided between the six lens L6 and the image surface Si.

In this embodiment, the first lens L1 is made of glass material, the second lens L2 is made of plastic material, the third lens L3 is made of glass material, the fourth lens L4 is made of plastic material, the fifth lens L5 is made of plastic material, and the sixth lens L6 is made of plastic material.

In this embodiment, it is defined that a refractive index of the first lens L1 is n1, and the following relationship expression is satisfied: $1.70 \leq n1 \leq 2.20$. This relationship expression specifies the selection of a high refractive index material for the first lens L1, which is conducive to reducing the caliber of the front end of the optical camera lens 10 and improving the imaging quality.

It is defined that a focal length of the optical camera lens 10 is f, and a focal length of the second lens L2 is f2. The second lens L2 has a negative refractive force. The following relationship expression is satisfied: $-2.30 \leq f2/f \leq -1.60$, in which a ratio of the focal length of the second lens L2 to the focal length of the optical camera lens 10 is specified. By reasonably distributing the optical focal length of the system, it is possible for the system to have a better imaging quality and a lower sensitivity.

It is defined that a central radius of curvature of an objective surface of the sixth lens L6 is R11, and a central radius of curvature of an image surface of the sixth lens L6 is R12. The following relationship expression is satisfied: $-1.80 \leq R11/R12 \leq -0.50$, in which the shape of the sixth lens L6 is specified. Within the range of the relationship expression, the degree of refraction of the light passing through the lens can be moderated, thereby efficiently correcting the chromatic aberration, in which the chromatic aberration $|LC| \leq 5.0$ μm.

It is defined that a focal length of the third lens L3 is f3, and a focal length of the fourth lens L4 is f4. The following relationship expression is satisfied: $0.10 \leq f3/f4 \leq 0.50$, in which a ratio of the focal lengths of the third lens L3 to the focal lengths of the fourth lens L4 is specified. By reasonably distributing the optical focal lengths of the system, the field curvature of the system can be effectively balanced so that the field curvature offset of the center field of view is less than 0.03 mm.

It is defined that an on-axis thickness of the third lens L3 is d5, and an on-axis distance from the image surface of the third lens L3 to the objective surface of the fourth lens L4 is d6. The following relationship expression is satisfied: $8.00 \leq d5/d6 \leq 30.00$, in which a ratio of the on-axis thickness of the third lens L3 to the on-axis distance from the image surface of the third lens L3 to the objective surface of the fourth lens L4 is specified. Within the range of this relationship expression, it is conducive to compressing the total length of the optical system.

When the refractive index of the first lens L1 of the optical camera lens 10, the ratio of the focal length of the second lens L2 and the focal length of the optical camera lens 10, the central radius of curvature of the objective surface of the sixth lens L6, the central radius of curvature of the image surface of the sixth lens L6, the ratio of the focal length of the third lens L3 to the focal length of the fourth lens L4, and the ratio of the on-axis thickness of the third lens L3 and the on-axis distance from the image surface of the third lens L3 to the objective surface of the fourth lens L4 in this embodiment satisfies the above relationship expressions, the optical camera lens 10 can be made to have excellent optical performance with a large aperture and an ultra-wide angle, which is particularly suitable for mobile phone camera lens assemblies, Web camera lenses, and in-vehicle camera lenses consisting of high-pixel CCD, CMOS and other camera elements.

In this embodiment, a combined focal length of the fourth lens L4 and the fifth lens L5 is f45, an on-axis thickness of the fourth lens L4 is d7, an on-axis distance from the image surface of the fourth lens L4 to the objective surface of the fifth lens L5 is d8, and an on-axis thickness of the fifth lens L5 is d9. The following relationship expression is satisfied: $-20.00 \leq f45/(d7+d8+d9) \leq -4.00$. Within the range of this relationship expression, it may help the combined lens to maintain a negative refractive force of sufficient strength to correct the off-axis aberration at the image surface, while effectively shortening the total track length.

In this embodiment, a refractive index of the third lens L3 is n3 and the following relationship expression is satisfied: $1.70 \leq n3 \leq 2.20$. It is specified that the third lens L3 is selected from a high-refractive material, which can help the light transition smoothly and improve the image quality.

In this embodiment, the objective surface of the first lens L1 is convex at a proximal-axis position, the image surface of the first lens L1 is concave at a proximal-axis position, and the first lens L1 has a negative refractive force.

It is defined that the focal length of the first lens L1 is f1, and the following relationship expression is satisfied: $-11.38 \leq f1/f \leq -2.62$, in which the negative refractive force of the first lens L1 is specified. When the negative refractive force of the first lens L1 exceeds the upper limit of the specified value, although it is conducive to the development of the lens toward ultra-thinness, the negative refractive force of the first lens L1 is too strong and it is difficult to make up for the aberration and other problems. Besides, it is not conducive to the development of the lens toward wide-angle. On the contrary, when the negative refractive force exceeds the lower limit of the specified value, the negative refractive force of the first lens L1 becomes too weak, and it is difficult to develop the lens toward ultra-thinness. In an embodiment, $-7.11 \leq f1/f \leq -3.27$.

A central radius of curvature of the objective surface of the first lens L1 is R1, and a central radius of curvature of the image surface of the first lens L1 is R2. The following relationship expression is satisfied: $0.83 \leq (R1+R2)/(R1-R2) \leq 2.81$. By reasonably controlling the shape of the first lens L1, it is possible to enable the first lens L1 to efficiently correct the systematic spherical aberration. In an embodiment, $1.32 \leq (R1+R2)/(R1-R2) \leq 2.25$.

A total track length of the optical camera lens 10 is TTL, and an on-axis thickness of the first lens L1 is d1. The following relationship expression is satisfied: $0.03 \leq d1/TTL \leq 0.29$, such a control can be conducive to the realization of ultra-thinness. In an embodiment, $0.05 \leq d1/TTL \leq 0.23$.

In this embodiment, an objective surface of the second lens L2 is concave at a proximal-axis position, and an image surface is concave at a proximal-axis position.

A central radius of curvature of the objective surface of the second lens L2 is R3, and a central radius of curvature of the image surface of the second lens L2 is R4. The following relationship is satisfied: $0.04 \leq (R3+R4)/(R3-R4) \leq 0.92$, in which the shape of the second lens L2 is specified. Within the range of the relationship expression, it is conducive to compensating for the on-axis chromatic aberration problems with the development of the lens towards ultra-thinness and wide-angle. In an embodiment, $$0.07 \leq (R3 + R4)/(R3 - R4) \leq 0.74.$$

The second lens L2 has an on-axis thickness of d3, which satisfies the following relationship expression: $0.02 \leq d3/TTL \leq 0.08$, which is conducive to realizing ultra-thinness.

In an embodiment, $0.03 \leq d3/TTL \leq 0.06$.

In this embodiment, an objective surface of the third lens L3 is convex at a proximal-axis position, an image surface thereof is convex at a proximal-axis position, and the third lens L3 has a positive refractive force.

It is defined that the focal length of the third lens L3 satisfies the following relationship expression: $1.11 \leq f3/f \leq 6.09$. By reasonable distribution of optical focal length, the system can be made to have better imaging quality and lower sensitivity. In an embodiment, $1.78 \leq f3/f \leq 4.87$.

A central radius of curvature of the objective surface of the third lens L3 is R5, and a central radius of curvature of the image surface of the third lens L3 is R6. The following relationship expression is satisfied: $-0.69 \leq (R5+R6)/(R5-R6) \leq -0.17$, in which the shape of the third lens L3 is specified. It facilitates the shaping of the third lens L3, and avoids shaping due to the surface curvature of the third lens L3 being too large for malformation and stress generation. In an embodiment, $-0.43 \leq (R5+R6)/(R5-R6) \leq -0.21$.

The on-axis thickness of the third lens L3 satisfies the following relationship expression: $0.09 \leq d5/TTL \leq 0.37$, which is conducive to realizing ultra-thinness. In an embodiment, $0.14 \leq d5/TTL \leq 0.30$.

In this embodiment, an objective surface of the fourth lens L4 is convex at a proximal-axis position, an image surface is convex at a proximal-axis position, and the fourth lens L4 has a positive refractive force.

It is defined that the focal length of the fourth lens L4 satisfies the following relationship expression: $2.71 \leq f4/f \leq 32.42$. By reasonable distribution of optical focal length, the system is made to have better imaging quality and lower sensitivity. In an embodiment, $$4.34 \leq f4/f \leq 25.93.$$

A central radius of curvature of the objective surface of the fourth lens L4 is R7, and a central radius of curvature of the image surface of the fourth lens L4 is R8. The following relationship expression is satisfied: $-0.40 \leq (R7+R8)/(R7-R8) \leq 0.58$, in which the shape of the fourth lens L4 is specified. Within the range of the relationship expression, it is conducive to compensating aberration of the off-axis drawing angle and other problems with the development of ultra-thinness and wide-angle. In an embodiment, $$-0.25 \leq (R7 + R8)/(R7 - R8) \leq 0.47.$$

The on-axis thickness of the fourth lens L4 satisfies the following relationship expression: $0.02 \leq d7/TTL \leq 0.13$, which is conducive to realizing ultra-thinness. In an embodiment, $0.03 \leq d7/TTL \leq 0.10$.

9
10

In this embodiment, an objective surface of the fifth lens L5 is concave at a proximal-axis position, an image surface is concave at a proximal-axis position, and the fifth lens L5 has a negative refractive force.

It is defined that the focal length of the fifth lens L5 is f5, and the following relationship expression is satisfied: $-9.35 \leq f5/f \leq -1.54$. The limitation of the fifth lens L5 can effectively make the light angle of the camera lens flat and reduce the tolerance sensitivity. In an embodiment, $-5.85 \leq f5/f \leq -1.92$.

A central radius of curvature of the objective surface of the fifth lens L5 is R9, and a central radius of curvature of the image surface of the fifth lens L5 is R10. The following relationship expression is satisfied: $-0.74 \leq (R9+R10)/(R9-R10) \leq 0.31$, in which the shape of the fifth lens L5 is specified. Within the range of the relationship expression, it is conducive to compensating for the aberration of off-axis drawing angles with the development of ultra-thinness and wide-angle. In an embodiment, $$-0.46 \leq (R9 + R10)/(R9 - R10) \leq 0.25.$$

The on-axis thickness of the fifth lens L5 satisfies the following relationship expression: $0.01 \leq d9/TTL \leq 0.06$, which is conducive to realizing ultra-thinness. In an embodiment, $0.01 \leq d9/TTL \leq 0.04$.

In this embodiment, an objective surface of the sixth lens L6 is convex at a proximal-axis position, an image surface is convex at a proximal-axis position, and the sixth lens L6 has a positive refractive force.

It is defined that a focal length of the sixth lens L6 is f6, and the following relationship expression is satisfied: $0.99 \leq f6/f \leq 3.98$. By the reasonable distribution of the optical focal length, the system is made to have better imaging quality and lower sensitivity. In an embodiment, $1.58 \leq f6/f \leq 3.19$.

An on-axis thickness of the sixth lens L6 is d11, and the following relationship expression is satisfied: $0.04 \leq d11/TTL \leq 0.21$, which is conducive to realizing ultra-thinness. In an embodiment, $0.07 \leq d11/TTL \leq 0.16$.

In this embodiment, the total track length (TTL) of the optical camera lens 10 is less than or equal to 23.24 mm, which is conducive to realizing ultra-thinness. In an embodiment, the TTL is less than or equal to 22.18 mm.

Such a design enables the total track length (TTL) of the overall optical camera lens 10 to be as short as possible, maintaining the small-sized characteristic.

Further, the aperture value (F number of aperture) of the optical camera lens is Fno, that is, a ratio of the effective focal length to the Entrance Pupil Diameter (ENPD), and the following relationship expression is satisfied: $Fno \leq 2.00$, which is conducive to the realizing a large aperture and excellent imaging performance. A field of view of the optical camera lens 10 is FOV, and the following relationship expression is satisfied: $FOV \geq 196.00°$, which is conducive to realizing wide-angle. That is, when the above relationship expressions are satisfied, the optical camera lens 10 makes it possible to realize the design requirements of large aperture and ultra-wide angle while possessing excellent optical imaging performance. According to the characteristics of the optical camera lens 10, the optical camera lens 10 is particularly suitable for mobile phone camera lens assemblies, Web camera lenses, and in-vehicle camera lenses consisting of high-pixel CCD, CMOS, and other camera elements.

The optical camera lens 10 of the present application will be described below by way of examples, and the symbols recorded in each example are shown below. The focal length, on-axis distance, central radius of curvature, on-axis thickness, inflection point position, and stationary point position are in mm.

TTL: total track length (the on-axis distance from the objective surface of the first lens L1 to the image surface Si) in mm;

Aperture value Fno: ratio of the effective focal length of the optical camera lens to the Entrance Pupil Diameter (ENPD).

In an embodiment, the lens may also be provided with an inflection point and/or a stationary point on the objective surface and/or the image surface of the lens to meet the need for high-quality imaging, and the specific implementable embodiments are described below.

Tables 1 and 2 show the design data of the optical camera lens 10 according to the first embodiment of the present application.

TABLE 1

|  | R | d | nd |  | vd |  |
|---|---|---|---|---|---|---|
| S1 | ∞ | d0 | −10.459 |  |  |  |
| R1 | 13.688 | d1 | 1.100 | nd1 | 1.8300 | v1 | 42.70 |
| R2 | 3.713 | d2 | 2.997 |  |  |  |
| R3 | −8.725 | d3 | 0.971 | nd2 | 1.5400 | v2 | 56.00 |
| R4 | 2.079 | d4 | 1.410 |  |  |  |
| R5 | 4.731 | d5 | 3.808 | nd3 | 1.9200 | v3 | 20.90 |
| R6 | −9.686 | d6 | 0.237 |  |  |  |
| R7 | 5.074 | d7 | 1.174 | nd4 | 1.5400 | v4 | 56.00 |
| R8 | −2.257 | d8 | 0.000 |  |  |  |
| R9 | −2.257 | d9 | 0.600 | nd5 | 1.6600 | v5 | 20.40 |
| R10 | 4.598 | d10 | 0.379 |  |  |  |
| R11 | 3.002 | d11 | 2.275 | nd6 | 1.5400 | v6 | 56.00 |
| R12 | −3.126 | d12 | 0.570 |  |  |  |
| R13 | ∞ | d13 | 0.300 | ndg1 | 1.5200 | vg1 | 54.50 |
| R14 | ∞ | d14 | 0.200 |  |  |  |
| R15 | ∞ | d15 | 0.400 | ndg2 | 1.5168 | vg2 | 64.17 |
| R16 | ∞ | d16 | 1.581 |  |  |  |

The meanings of the symbols in the table are as follows:

S1: aperture;

R: central radius of curvature at the center of the optical surface;

R1: central radius of curvature of the objective surface of the first lens L1;

R2: central radius of curvature of the image surface of the first lens L1;

R3: central radius of curvature of the objective surface of the second lens L2;

R4: central radius of curvature of the image surface of the second lens L2;

R5: central radius of curvature of the objective surface of the third lens L3;

R6: central radius of curvature of the image surface of the third lens L3;

R7: central radius of curvature of the objective surface of the fourth lens L4;

R8: central radius of curvature of the image surface of the fourth lens L4;

R9: central radius of curvature of the objective surface of the fifth lens L5;

R10: central radius of curvature of the image surface of the fifth lens L5;

R11: central radius of curvature of the objective surface of the sixth lens L6;

R12: central radius of curvature of the image surface of the sixth lens L6;

R13: central radius of curvature of the objective surface of the first optical filter GF1;

R14: central radius of curvature of the image surface of the first optical filter GF1;

R15: central radius of curvature of the objective surface of the second optical filter GF2;

R16: central radius of curvature of the image surface of the second optical filter GF2;

d: on-axis thickness of the lens, and on-axis distance between the lenses;

d0: on-axis distance from the aperture S1 to the objective surface of the first lens L1;

d1: on-axis thickness of the first lens L1;

d2: on-axis distance from the image surface of the first lens L1 to the objective surface of the second lens L2;

d3: on-axis thickness of the second lens L2;

d4: on-axis distance from the image surface of the second lens L2 to the objective surface of the third lens L3;

d5: on-axis thickness of the third lens L3;

d6: on-axis distance from the image surface of the third lens L3 to the objective surface of the fourth lens L4;

d7: on-axis thickness of the fourth lens L4;

d8: on-axis distance from the image surface of the fourth lens L4 to the objective surface of the fifth lens L5;

d9: on-axis thickness of the fifth lens L5;

d10: on-axis distance from the image surface of the fifth lens L5 to the objective surface of the sixth lens L6;

d11: on-axis thickness of the sixth lens L6;

d12: on-axis distance from the image surface of the sixth lens L6 to the objective surface of the seventh lens L7;

d13: on-axis thickness of the first optical filter GF1;

d14: on-axis distance from the image surface of the first optical filter GF1 to the objective surface of the optical filter GF;

d15: on-axis thickness of the second optical filter GF2;

d16: on-axis distance from the image surface of the second optical filter GF2 to the objective surface of the optical filter GF;

nd: refractive index of the line d (the line d is green light with a wavelength of 550 nm);

nd1: refractive index of the line d of the first lens L1;

nd2: refractive index of the line d of the second lens L2;

nd3: refractive index of the line d of the third lens L3;

nd4: refractive index of the line d of the fourth lens L4;

nd5: refractive index of the line d of the fifth lens L5;

nd6: refractive index of line d of the sixth lens L6;

ndg1: refractive index of line d of the first optical filter GF1;

ndg2: refractive index of line d of the second optical filter GF2;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

vg1: Abbe number of the first optical filter GF1;

vg2: Abbe number of the second optical filter GF2.

Table 2 illustrates the aspheric data of each lens in the optical camera lens 10 according to the first embodiment of the present application.

TABLE 2

| | Cone Coefficient | Aspheric Coefficient | | | |
|---|---|---|---|---|---|
| | k | A4 | A6 | A8 | A10 |
| R1 | / | / | / | / | / |
| R2 | / | / | / | / | / |
| R3 | −9.00001E+01 | 1.28908E−02 | −4.00174E−03 | 7.80283E−04 | −1.04973E−04 |
| R4 | −3.20385E−01 | 2.95197E−02 | −4.90300E−03 | −6.67815E−03 | 6.73352E−03 |
| R5 | / | / | / | / | / |
| R6 | / | / | / | / | / |
| R7 | 9.33682E+00 | −1.69203E−03 | 3.57763E−03 | −1.49912E−02 | 2.73397E−02 |
| R8 | −1.55634E+00 | −2.95886E−01 | 8.25142E−01 | −2.16845E+00 | 4.37075E+00 |
| R9 | −1.55634E+00 | −2.95886E−01 | 8.25142E−01 | −2.16845E+00 | 4.37075E+00 |
| R10 | −4.10239E+01 | −3.32064E−02 | 6.95129E−02 | −6.99609E−02 | 4.87732E−02 |
| R11 | −8.50406E+00 | −2.96708E−02 | 2.47426E−02 | −1.56725E−02 | 7.01123E−03 |
| R12 | −2.65106E+00 | −3.65280E−03 | −4.80375E−03 | 3.91843E−03 | −1.81050E−03 |

| | Aspheric Coefficient | | | | |
|---|---|---|---|---|---|
| | A12 | A14 | A16 | A18 | A20 |
| R1 | / | / | / | / | / |
| R2 | / | / | / | / | / |
| R3 | 9.49580E−06 | −5.61102E−07 | 2.05668E−08 | −4.19700E−10 | 3.59102E−12 |
| R4 | −3.46089E−03 | 1.09821E−03 | −2.17309E−04 | 2.44963E−05 | −1.19836E−06 |
| R5 | / | / | / | / | / |
| R6 | / | / | / | / | / |
| R7 | −2.94598E−02 | 1.90205E−02 | −6.86383E−03 | 1.25066E−03 | −8.91223E−05 |
| R8 | −6.10630E+00 | 5.56399E+00 | −3.13483E+00 | 9.87631E−01 | −1.32942E−01 |
| R9 | −6.10630E+00 | 5.56399E+00 | −3.13483E+00 | 9.87631E−01 | −1.32942E−01 |
| R10 | −2.25085E−02 | 6.60360E−03 | −1.16361E−03 | 1.09917E−04 | −4.18429E−06 |
| R11 | −2.07783E−03 | 3.98601E−04 | −4.71557E−05 | 3.10155E−06 | −8.60169E−08 |
| R12 | 4.94302E−04 | −7.85955E−05 | 6.82039E−06 | −2.60792E−07 | 1.88493E−09 |

For convenience, the aspheric surfaces of the individual lens surfaces use the aspheric surfaces shown in Equation (1) below. However, the present application is not limited to the polynomial form of the aspheric surfaces expressed in Equation (1).

$$z = (cr^2)/\{1 + [1 - (k+1)(c^2r^2)]^{1/2}\} + A4r^4 + A6r^6 + \qquad (1)$$
$$A8r^8 + A10r^{10} + A12r^{12} + A14r^{14} + A16r^{16} + A18r^{18} + A20r^{20}$$

k is the cone coefficient; A4, A6, A8, A10, A12, A14, A16, A18, A20 is the aspheric coefficient; c is the curvature at the center of the optical surface; r is the perpendicular distance between the point on the aspheric curve and the optical axis; and z is the aspheric depth (the perpendicular distance between the point on the aspheric surface at a distance of r from the optical axis and the cut surface tangent to the apex of the aspheric surface on the optical axis).

Table 3 shows the design data of the inflection point of each lens in the optical camera lens 10 according to the first embodiment of the present application. P1R1, P1R2 represent the objective surface and the image surface of the first lens L1, respectively; P2R1, P2R2 represent the objective surface and the image surface of the second lens L2, respectively; P3R1, P3R2 represent the objective surface and the image surface of the third lens L3, respectively; P4R1, P4R2 represent the objective surface and the image surface of the fourth lens L4, respectively; P5R1, P5R2 represent the objective surface and the image surface of the fifth lens L5, respectively; P6R1, P6R2 represent the objective surface and the image surface of the sixth lens L6, respectively. The data corresponding to the "position of the inflection point" field is the perpendicular distance from the inflection point set on the surface of each lens to the optical axis of the optical camera lens 10.

TABLE 3

|  | Number of Inflection Points | Position of Inflection Point 1 |
|---|---|---|
| PIR1 | / | / |
| P1R2 | / | / |
| P2R1 | 1 | 0.79 |
| P2R2 | / | / |
| P3R1 | / | / |
| P3R2 | / | / |
| P4R1 | / | / |
| P4R2 | / | / |
| P5R1 | / | / |
| P5R2 | / | / |
| P6R1 | / | / |
| P6R2 | / | / |

Figure 2:
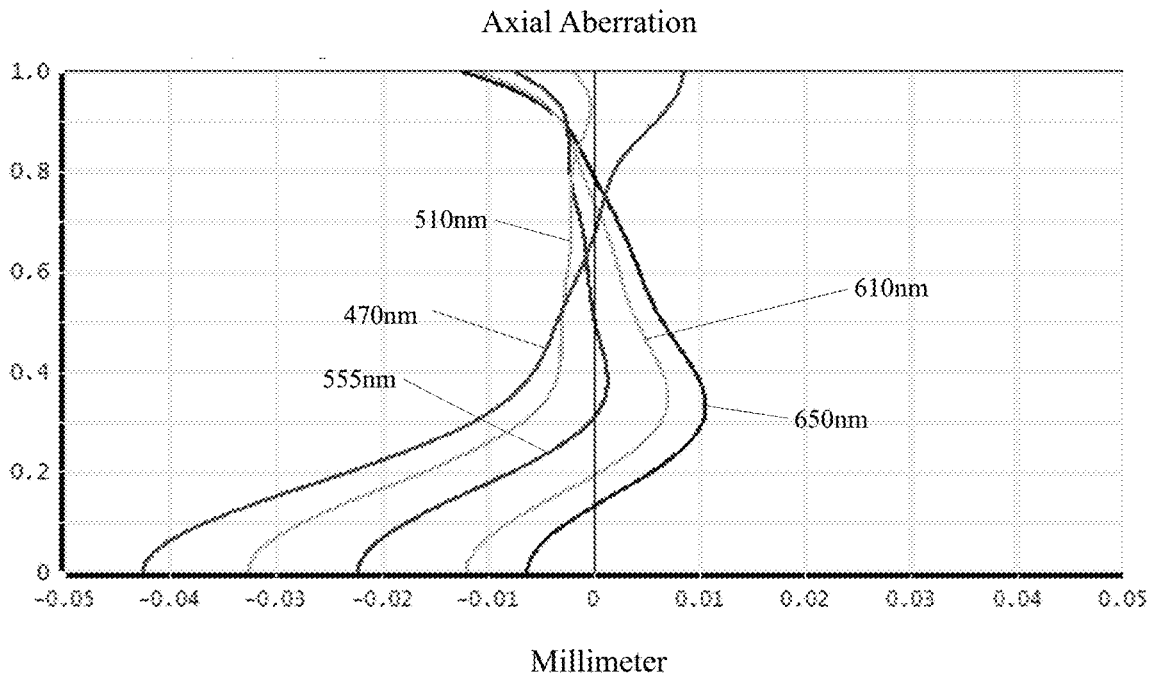
FIG. 2 is a schematic diagram showing the axial aberration of the optical camera lens shown in FIG. 1.
Figure 3:
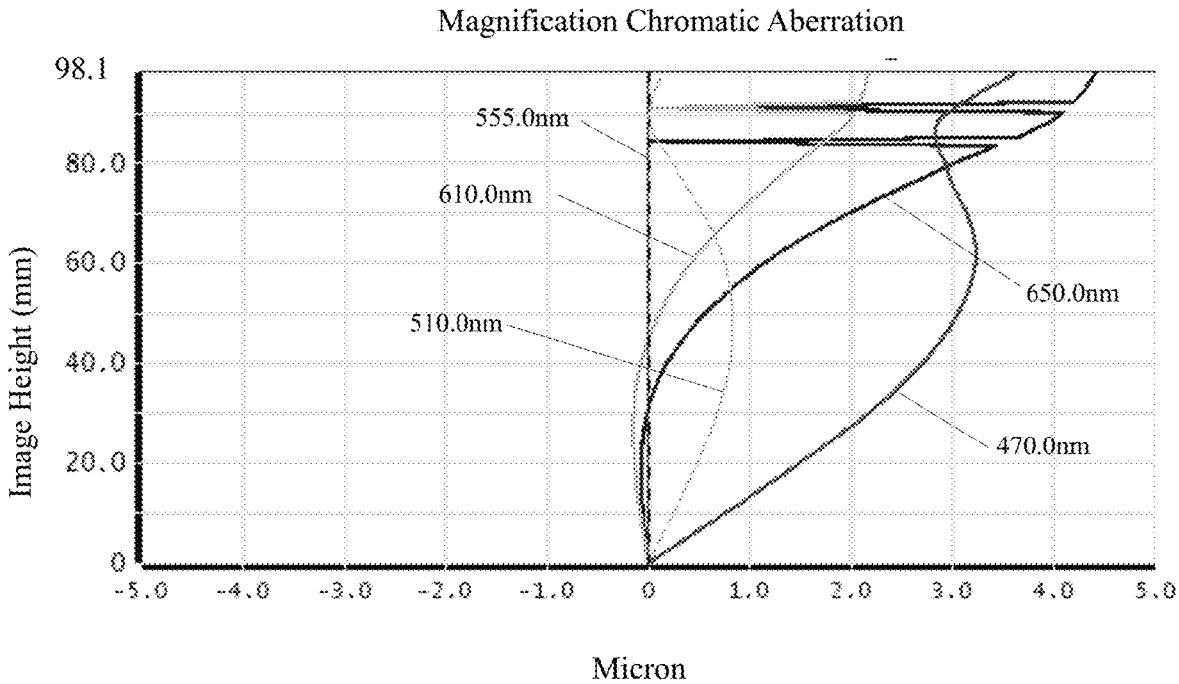
FIG. 3 is a schematic diagram showing the magnification chromatic aberration of the optical camera lens shown in FIG. 1.
Figure 4:
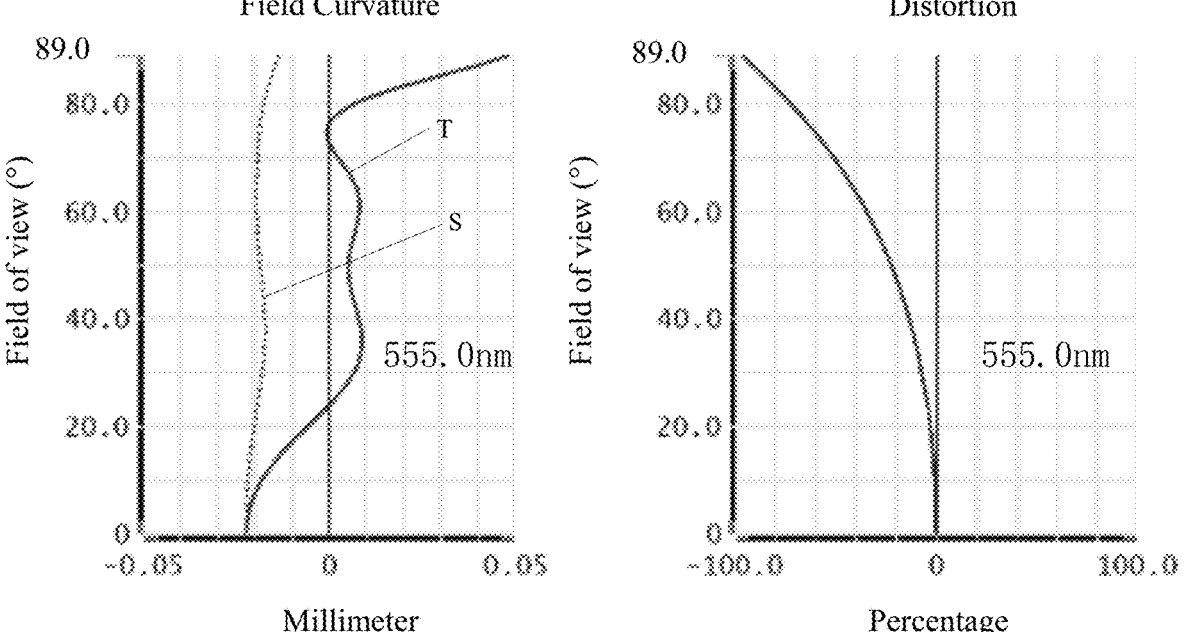
FIG. 4 is a schematic diagram showing the field curvature and distortion of the optical camera lens shown in FIG. 1.

FIGS. 2 and 3 are schematic diagrams showing the axial aberration and magnification chromatic aberration of light with wavelengths of 650 nm, 610 nm, 555 nm, 510 nm, and 470 nm, respectively, after passing through the optical camera lens 10 according to the first embodiment. FIG. 4 is a schematic diagram showing the field curvature and distortion of light with a wavelength of 550 nm after passing through the optical camera lens 10 according to the first embodiment. The field curvature S of FIG. 4 is a field curvature in the arc-sagittal direction, and the field curvature T is a field curvature in the meridional direction.

Table 19 in the following shows various values and the values corresponding to the parameters specified in the relationship expressions in each of the first embodiment, second embodiment, third embodiment, fourth embodiment, fifth embodiment, and comparison embodiment.

As shown in Table 19, the first embodiment satisfies each of the relationship expressions.

In this embodiment, the optical camera lens 10 has an Entrance Pupil Diameter (ENPD) of 0.734 mm, a full field-of-view image height (IH) of 2.883 mm, a field of view (FOV) of 196.00° in the diagonal direction, and an aperture value Fno of 2.00. The optical camera lens 10 satisfies the design requirements of large aperture and ultra-wide angle and possesses excellent optical characteristics due to its on-axis and off-axis chromatic aberration being sufficiently compensated.

Second Embodiment

Figure 5:
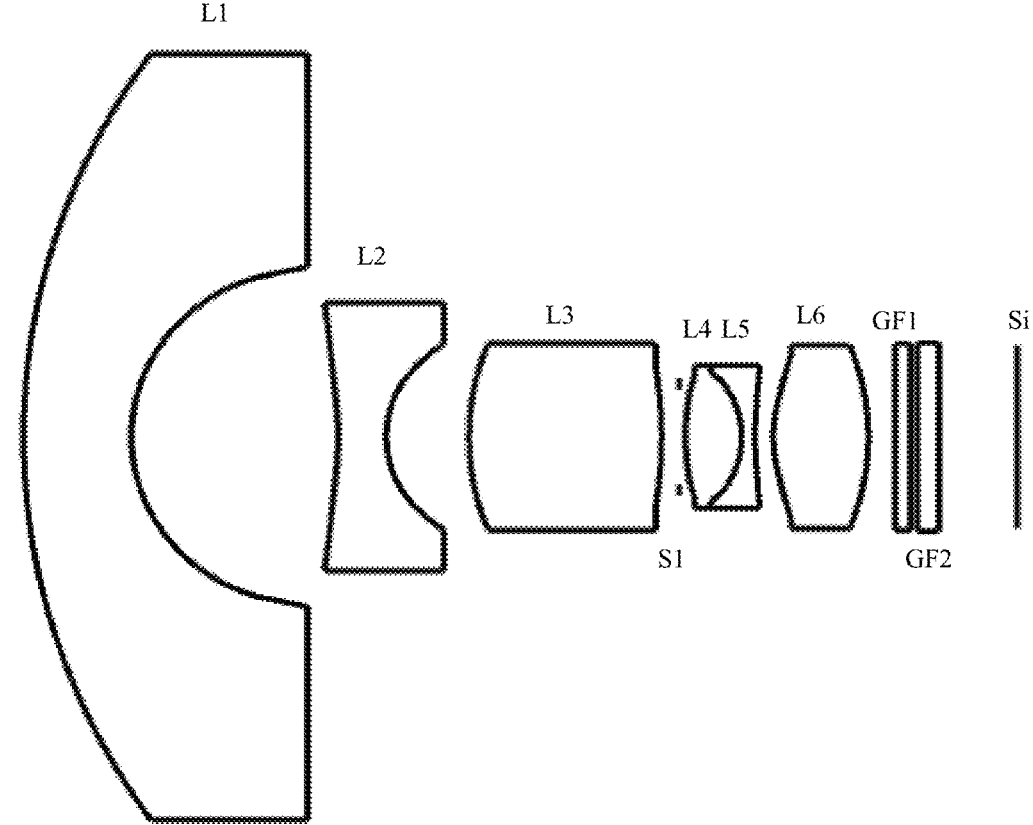
FIG. 5 is a structural schematic diagram of the optical camera lens according to the second embodiment of the present application.

The second embodiment is basically the same as the first embodiment, and the symbols have the same meaning as that of the first embodiment. The structural form of the optical camera lens 20 according to the second embodiment is shown in FIG. 5, and only the differences are listed below.

Tables 4 and 5 show the design data of the optical camera lens 20 according to the second embodiment of the present application.

TABLE 4

|  | R | d |  | nd |  | vd |  |
|---|---|---|---|---|---|---|---|
| S1 | ∞ | d0 | −12.665 |  | / |  | / |
| R1 | 13.617 | d1 | 2.082 | nd1 | 1.7100 | v1 | 46.31 |
| R2 | 3.395 | d2 | 3.988 |  |  |  |  |
| R3 | −5.786 | d3 | 0.934 | nd2 | 1.5370 | v2 | 55.98 |
| R4 | 2.353 | d4 | 1.594 |  |  |  |  |
| R5 | 5.081 | d5 | 3.717 | nd3 | 1.8931 | v3 | 23.91 |
| R6 | −8.788 | d6 | 0.464 |  |  |  |  |
| R7 | 5.024 | d7 | 1.081 | nd4 | 1.5370 | v4 | 55.98 |
| R8 | −2.352 | d8 | 0.000 |  |  |  |  |
| R9 | −2.352 | d9 | 0.258 | nd5 | 1.6610 | v5 | 20.53 |
| R10 | 5.119 | d10 | 0.357 |  |  |  |  |
| R11 | 2.487 | d11 | 1.834 | nd6 | 1.5370 | v6 | 55.98 |
| R12 | −4.923 | d12 | 0.512 |  |  |  |  |
| R13 | ∞ | d13 | 0.300 | ndg1 | 1.5200 | vg1 | 54.50 |
| R14 | ∞ | d14 | 0.146 |  |  |  |  |
| R15 | ∞ | d15 | 0.400 | ndg2 | 1.5168 | vg2 | 64.17 |
| R16 | ∞ | d16 | 1.518 |  |  |  |  |

Table 5 illustrates the aspheric data for each lens in the optical camera lens 20 according to the second embodiment of the present application.

TABLE 5

|  | Cone Coefficient | Aspheric Coefficient |  |  |  |
|---|---|---|---|---|---|
|  | k | A4 | A6 | A8 | A10 |
| R1 | / | / | / | / | / |
| R2 | / | / | / | / | / |
| R3 | −2.99356E+01 | 1.10270E−02 | −3.87500E−03 | 7.83820E−04 | −1.05280E−04 |

TABLE 5-continued

| | | | | |
|---|---|---|---|---|
| R4 | −2.01384E−01 | 3.36490E−02 | −3.54970E−03 | −6.94390E−03 | 6.75330E−03 |
| R5 | / | / | / | / | / |
| R6 | / | / | / | / | / |
| R7 | 8.21968E+00 | −6.47500E−03 | 4.69530E−03 | −1.41720E−02 | 2.74240E−02 |
| R8 | −2.33449E+00 | −2.93130E−01 | 8.32520E−01 | −2.16910E+00 | 4.36760E+00 |
| R9 | −2.33449E+00 | −2.93130E−01 | 8.32520E−01 | −2.16910E+00 | 4.36760E+00 |
| R10 | −7.63229E+01 | −3.85890E−02 | 6.74950E−02 | −7.01990E−02 | 4.88300E−02 |
| R11 | −5.95360E+00 | −2.98310E−02 | 2.47260E−02 | −1.57010E−02 | 7.00290E−03 |
| R12 | −5.67525E+00 | −2.18790E−03 | −4.88190E−03 | 3.89960E−03 | −1.79720E−03 |

| Aspheric Coefficient | | | | |
|---|---|---|---|---|
| | A12 | A14 | A16 | A18 | A20 |
| R1 | / | / | / | / | / |
| R2 | / | / | / | / | / |
| R3 | 9.47800E−06 | −5.60700E−07 | 2.07170E−08 | −4.16230E−10 | 2.85530E−12 |
| R4 | −3.44510E−03 | 1.10010E−03 | −2.17630E−04 | 2.43670E−05 | −1.17760E−06 |
| R5 | / | / | / | / | / |
| R6 | / | / | / | / | / |
| R7 | −2.95950E−02 | 1.89970E−02 | −6.84920E−03 | 1.27620E−03 | −1.20070E−04 |
| R8 | −6.10800E+00 | 5.56370E+00 | −3.13470E+00 | 9.87890E−01 | −1.32790E−01 |
| R9 | −6.10800E+00 | 5.56370E+00 | −3.13470E+00 | 9.87890E−01 | −1.32790E−01 |
| R10 | −2.24770E−02 | 6.60590E−03 | −1.16580E−03 | 1.09350E−04 | −3.51060E−06 |
| R11 | −2.07830E−03 | 3.99290E−04 | −4.68110E−05 | 3.15530E−06 | −1.30000E−07 |
| R12 | 4.98040E−04 | −7.80630E−05 | 6.80950E−06 | −2.84400E−07 | −2.66410E−09 |

Tables 6 shows the design data of the inflection point of each lens in the optical camera lens 20 according to the second embodiment of the present application.

TABLE 6

| | Number of Inflection Points | Position of Inflection Point 1 |
|---|---|---|
| PIR1 | 0 | / |
| P1R2 | 1 | 3.395 |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |

Figure 6:
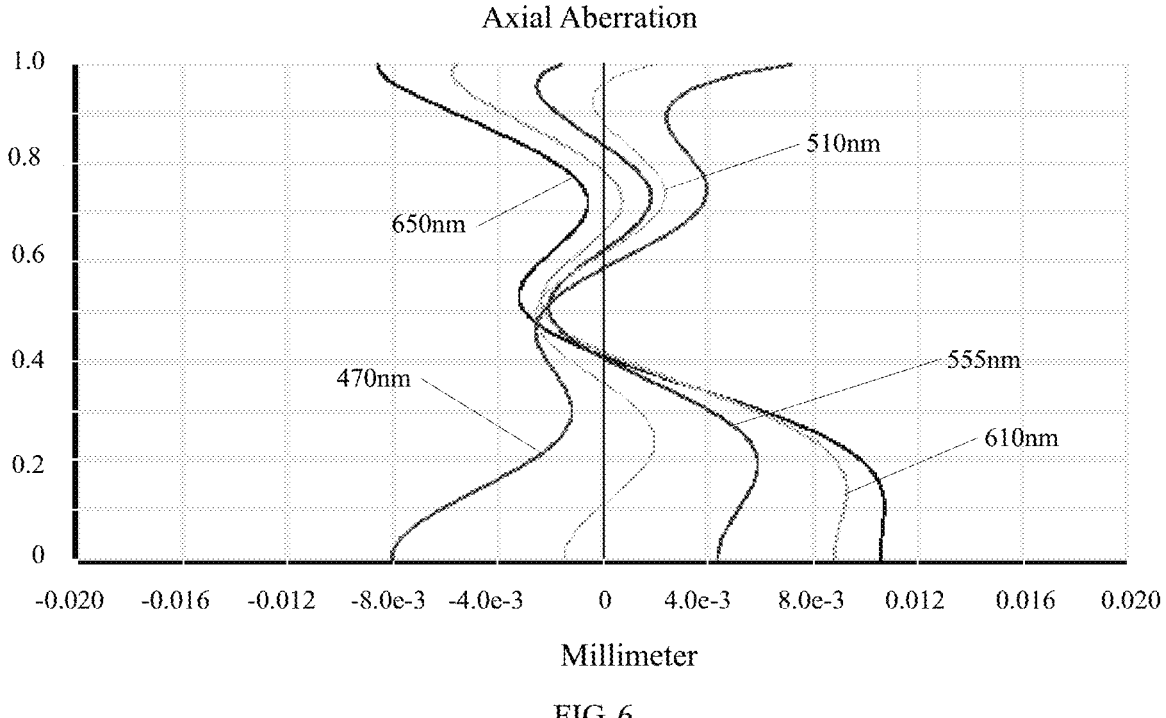
FIG. 6 is a schematic diagram showing the axial aberration of the optical camera lens shown in FIG. 5.
Figure 7:
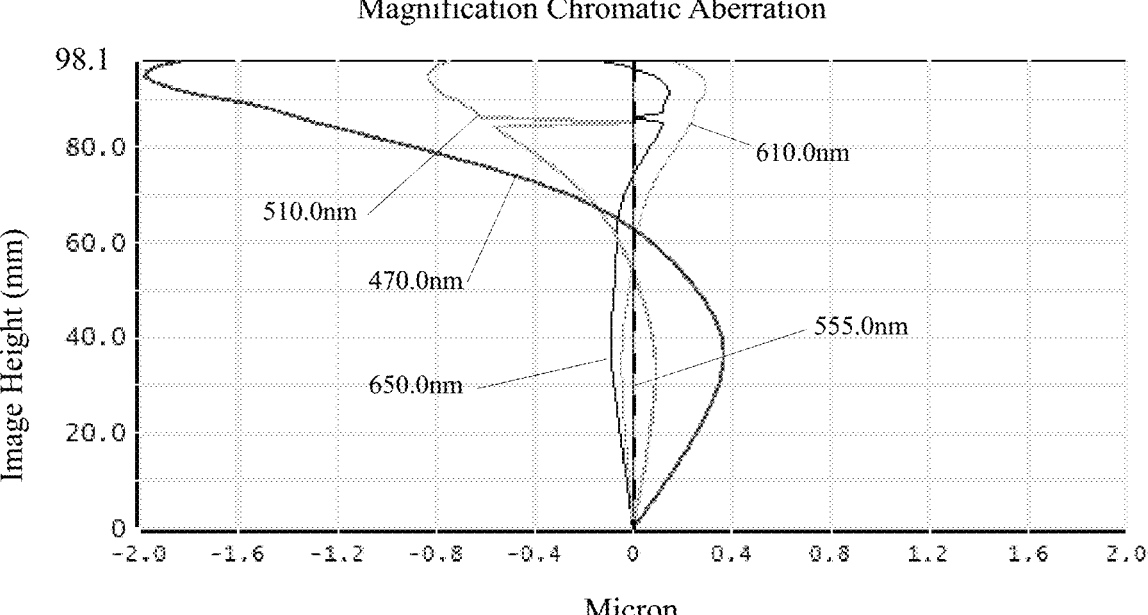
FIG. 7 is a schematic diagram showing the magnification chromatic aberration of the optical camera lens shown in FIG. 5.
Figure 8:
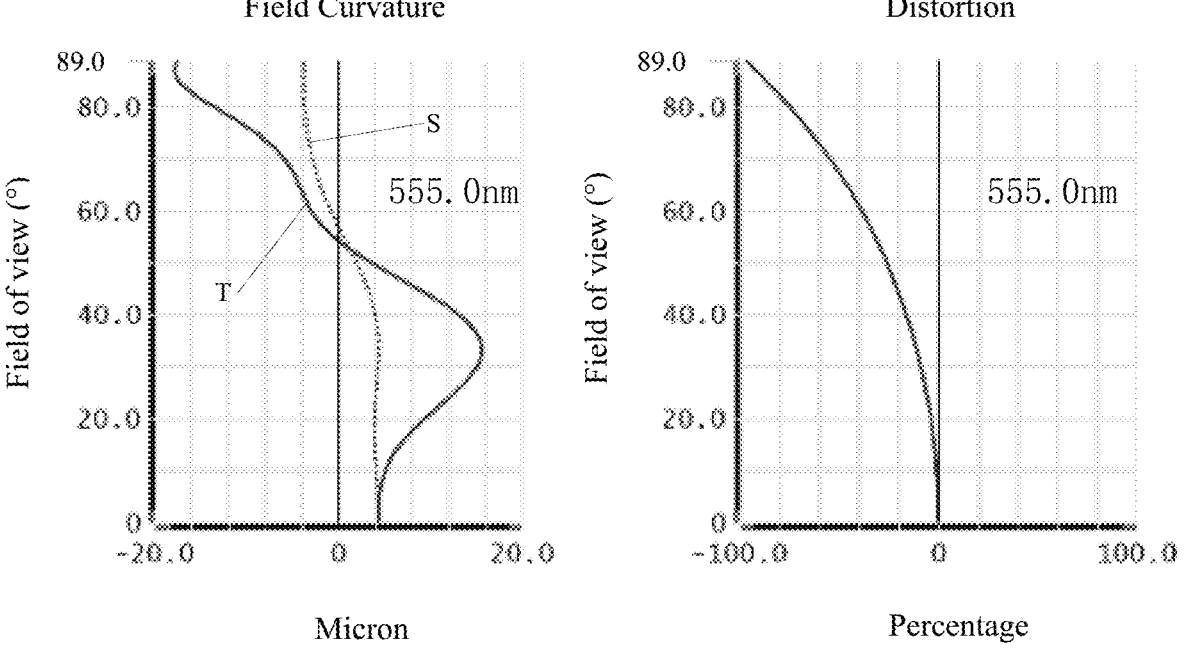
FIG. 8 is a schematic diagram showing the field curvature and distortion of the optical camera lens shown in FIG. 5.

FIGS. 6 and 7 are schematic diagrams showing the axial aberration and magnification chromatic aberration of light with wavelengths of 650 nm, 610 nm, 555 nm, 510 nm, and 470 nm, respectively, after passing through the optical camera lens 20 according to the second embodiment. FIG. 8 is a schematic diagram showing the field curvature and distortion of light with a wavelength of 550 nm after passing through the optical camera lens 20 according to the second embodiment. The field curvature S of FIG. 8 is the field curvature in the arc-sagittal direction and T is the field curvature in the meridional direction.

As shown in Table 19, the second embodiment satisfies each of the relationship expressions.

In this embodiment, the optical camera lens 20 has an Entrance Pupil Diameter (ENPD) of 0.649 mm, a full field-of-view image height (IH) of 2.299 mm, a field of view (FOV) of 196.00° in the diagonal direction, and an aperture value Fno of 2.00. The optical camera lens 20 satisfies the design requirements of large aperture and ultra-wide angle and possesses excellent optical characteristics due to its on-axis and off-axis chromatic aberration being sufficiently compensated.

Third Embodiment

Figure 9:
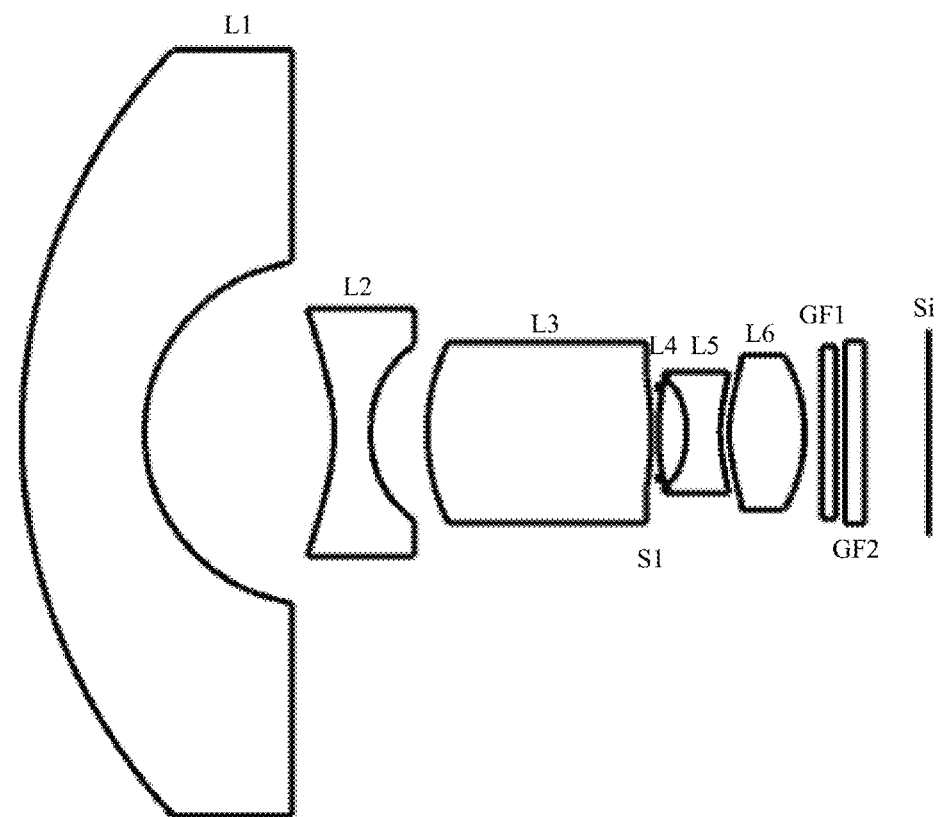
FIG. 9 is a structural schematic diagram of the optical camera lens according to the third embodiment of the present application.

The third embodiment is basically the same as the first embodiment, and the meaning of the symbols is the same as that of the first embodiment. The structural form of the optical camera lens 30 according to the third embodiment is shown in FIG. 9, and only the differences are listed below.

Tables 7 and 8 show the design data of the optical camera lens 30 according to the third embodiment of the present application.

TABLE 7

| | R | | d | | nd | | vd |
|---|---|---|---|---|---|---|---|
| S1 | ∞ | d0 | −13.464 | | / | | / |
| R1 | 12.434 | d1 | 2.597 | nd1 | 2.1994 | v1 | 49.13 |
| R2 | 3.782 | d2 | 4.012 | | | | |
| R3 | −3.783 | d3 | 0.776 | nd2 | 1.5370 | v2 | 55.98 |
| R4 | 3.159 | d4 | 1.196 | | | | |
| R5 | 4.539 | d5 | 4.734 | nd3 | 2.1903 | v3 | 30.12 |
| R6 | −8.303 | d6 | 0.158 | | | | |
| R7 | 5.096 | d7 | 0.602 | nd4 | 1.5256 | v4 | 70.85 |
| R8 | −2.242 | d8 | 0.000 | | | | |
| R9 | −2.242 | d9 | 0.711 | nd5 | 1.6846 | v5 | 22.51 |
| R10 | 2.927 | d10 | 0.185 | | | | |
| R11 | 2.321 | d11 | 1.598 | nd6 | 1.5370 | v6 | 55.98 |
| R12 | −3.730 | d12 | 0.368 | | | | |
| R15 | ∞ | d13 | 0.300 | ndg1 | 1.5233 | vg1 | 54.52 |
| R16 | ∞ | d14 | 0.193 | | | | |
| R17 | ∞ | d15 | 0.400 | ndg2 | 1.5168 | vg2 | 64.17 |
| R18 | ∞ | d16 | 1.376 | | | | |

Table 8 illustrates the aspheric data for each lens in the optical camera lens 30 according to the third embodiment of the present application.

TABLE 8

| | Cone Coefficient | Aspheric Coefficient | | | |
|---|---|---|---|---|---|
| | k | A4 | A6 | A8 | A10 |
| R1 | / | / | / | / | / |
| R2 | / | / | / | / | / |
| R3 | −8.53442E+00 | 7.20140E−03 | −3.34110E−03 | 7.86130E−04 | −1.08520E−04 |
| R4 | −7.69099E−01 | 3.08250E−02 | 2.05680E−04 | −6.95470E−03 | 6.66210E−03 |
| R5 | / | / | / | / | / |
| R6 | / | / | / | / | / |
| R7 | 5.87489E+00 | −7.29680E−03 | −1.71400E−03 | −8.57920E−03 | 3.13160E−02 |
| R8 | −1.40419E+01 | −2.91130E−01 | 7.84700E−01 | −2.15630E+00 | 4.34650E+00 |
| R9 | −1.40419E+01 | −2.91130E−01 | 7.84700E−01 | −2.15630E+00 | 4.34650E+00 |
| R10 | −2.17979E+01 | −2.50950E−02 | 6.12470E−02 | −7.22300E−02 | 4.98700E−02 |
| R11 | −1.25260E+01 | −2.31570E−02 | 2.06800E−02 | −1.63700E−02 | 7.28280E−03 |
| R12 | −1.51565E+00 | −8.80160E−03 | −3.40610E−03 | 3.53500E−03 | −1.82760E−03 |

| | Aspheric Coefficient | | | | |
|---|---|---|---|---|---|
| | A12 | A14 | A16 | A18 | A20 |
| R1 | / | / | / | / | / |
| R2 | / | / | / | / | / |
| R3 | 9.24990E−06 | −5.48770E−07 | 2.51430E−08 | −4.64970E−11 | −6.53640E−11 |
| R4 | −3.44280E−03 | 1.10490E−03 | −2.17140E−04 | 2.40740E−05 | −1.16510E−06 |
| R5 | / | / | / | / | / |
| R6 | / | / | / | / | / |
| R7 | −2.82290E−02 | 1.76490E−02 | −7.19580E−03 | −5.48010E−03 | 6.76600E−03 |
| R8 | −6.09190E+00 | 5.57370E+00 | −3.14170E+00 | 9.76090E−01 | −1.29800E−01 |
| R9 | −6.09190E+00 | 5.57370E+00 | −3.14170E+00 | 9.76090E−01 | −1.29800E−01 |
| R10 | −2.14740E−02 | 6.68100E−03 | −1.38290E−03 | 3.69640E−05 | 4.62740E−05 |
| R11 | −1.75250E−03 | 4.78600E−04 | −5.53810E−05 | −8.83210E−06 | −2.38190E−07 |
| R12 | 5.22580E−04 | −7.18410E−05 | 6.62810E−06 | −6.22290E−07 | 3.66680E−07 |

Table 9 shows the design data of the inflection point of each lens in the optical camera lens 30 according to the third embodiment of the present application.

TABLE 9

| | Number of Inflection Points | Position of Inflection Point 1 | Position of Inflection Point 2 |
|---|---|---|---|
| P1R1 | / | / | / |
| P1R2 | / | / | / |
| P2R1 | / | / | / |
| P2R2 | / | / | / |
| P3R1 | / | / | / |
| P3R2 | / | / | / |
| P4R1 | / | / | / |
| P4R2 | / | / | / |
| P5R1 | / | / | / |
| P5R2 | / | / | / |
| P6R1 | 2 | 0.975 | 1.025 |
| P6R2 | 1 | 1.535 | / |

Figure 10:
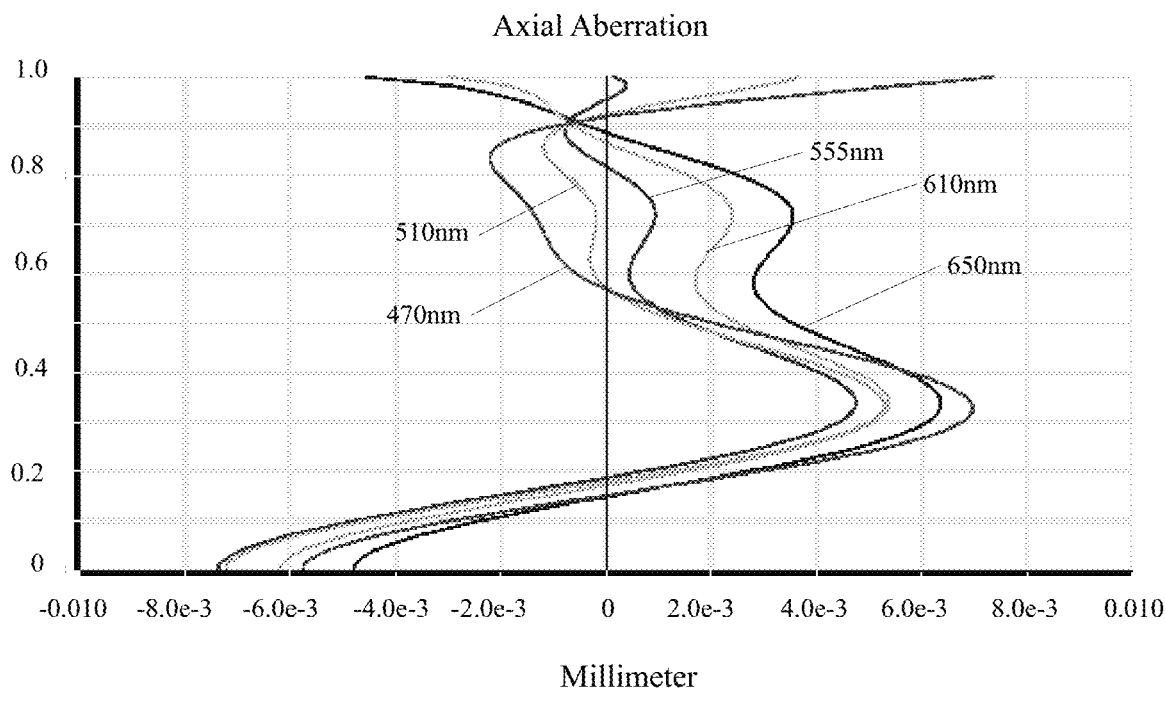
FIG. 10 is a schematic diagram showing the axial aberration of the optical camera lens shown in FIG. 9.
Figure 11:
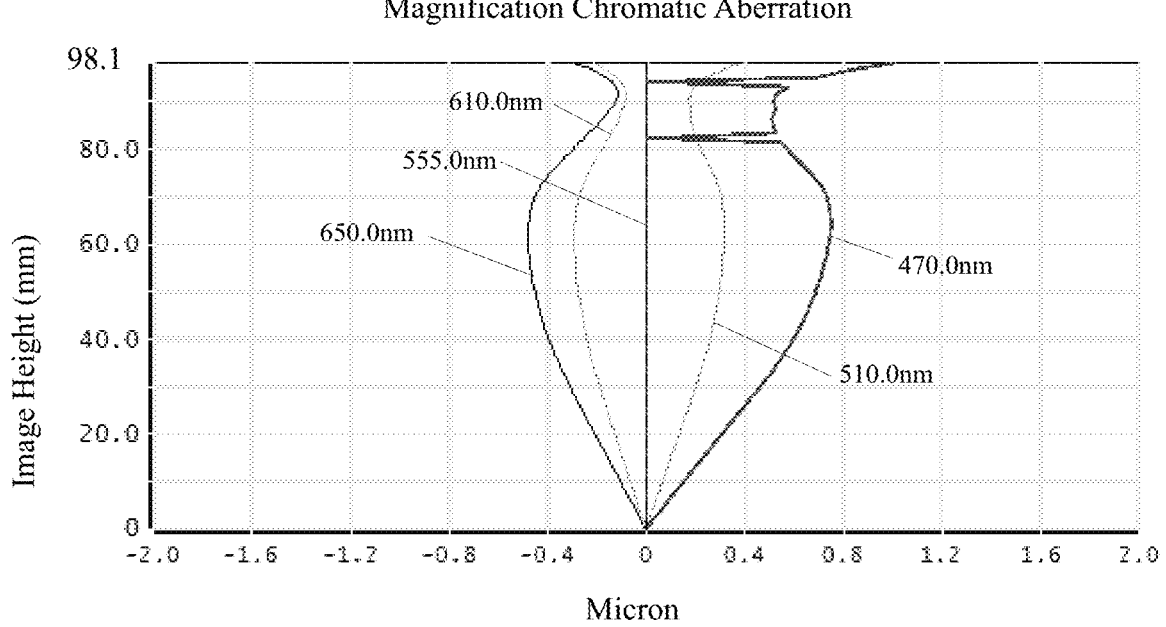
FIG. 11 is a schematic diagram showing the magnification chromatic aberration of the optical camera lens shown in FIG. 9.
Figure 12:
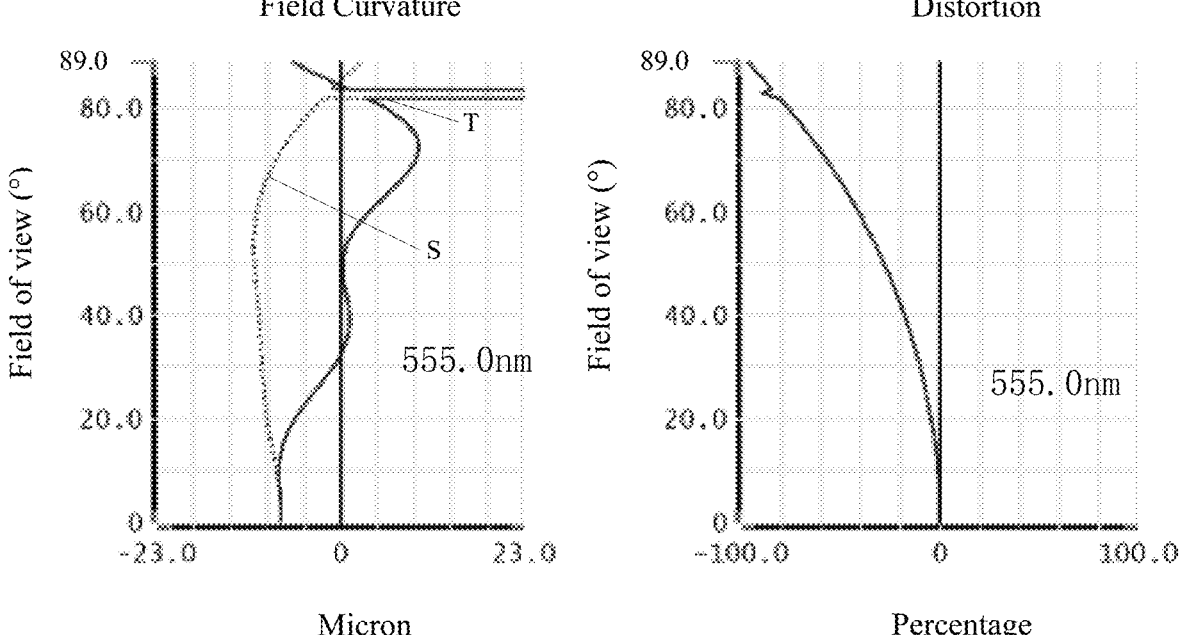
FIG. 12 is a schematic diagram showing the field curvature and distortion of the optical camera lens shown in FIG. 9.

FIGS. 10 and 11 are schematic diagrams showing the axial aberration and magnification chromatic aberration of light with wavelengths of 650 nm, 610 nm, 555 nm, 510 nm, and 470 nm, respectively, after passing through the optical camera lens 30 according to the third embodiment. FIG. 12 is a schematic diagram showing the field curvature and distortion of light with a wavelength of 550 nm after passing through the optical camera lens 30 according to the third embodiment. The field curvature S of FIG. 12 is the field curvature in the arc-sagittal direction, and T is the field curvature in the meridional direction.

Table 19 in the following lists the values corresponding to each of the relationship expressions in this embodiment in accordance with the above relationship expressions. It is clear that the optical camera lens 30 of this embodiment satisfies the above-described relationship expressions.

In this embodiment, the optical camera lens 30 has an Entrance Pupil Diameter (ENPD) of 0.688 mm, a full field-of-view image height (IH) of 2.188 mm, a field of view (FOV) of 196.00° in the diagonal direction, and an aperture value Fno of 2.00. The optical camera lens 30 satisfies the design requirements of large aperture and ultra-wide angle and possesses excellent optical characteristics due to its on-axis and off-axis chromatic aberration being sufficiently compensated.

Fourth Embodiment

Figure 13:
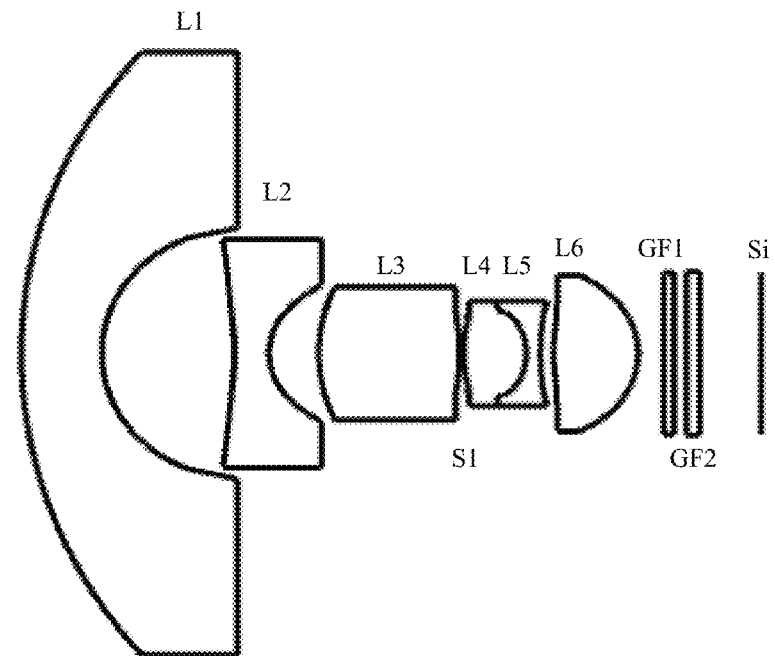
FIG. 13 is a structural schematic diagram of the optical camera lens according to the fourth embodiment of the present application.

The fourth embodiment is basically the same as the first embodiment, and the meaning of the symbols is the same as that of the first embodiment. The structural form of the optical camera lens 40 according to the fourth embodiment is shown in FIG. 13, and only the differences are listed below.

Tables 10 and 11 show the design data of the optical camera lens 40 according to the fourth embodiment of the present application.

TABLE 10

| | R | d | | nd | | vd |
|---|---|---|---|---|---|---|
| S1 | ∞ | d0 | −12.736 | / | | / |
| R1 | 14.604 | d1 | 2.299 | nd1 | 1.8266 | v1 | 53.88 |
| R2 | 3.861 | d2 | 3.791 | | | |
| R3 | −5.515 | d3 | 0.984 | nd2 | 1.5370 | v2 | 55.98 |
| R4 | 2.175 | d4 | 1.419 | | | |
| R5 | 4.935 | d5 | 4.010 | nd3 | 1.7010 | v3 | 19.54 |
| R6 | −8.271 | d6 | 0.134 | | | |
| R7 | 4.886 | d7 | 1.781 | nd4 | 1.5351 | v4 | 51.01 |
| R8 | −2.576 | d8 | 0.000 | | | |
| R9 | −2.576 | d9 | 0.403 | nd5 | 1.6616 | v5 | 20.86 |
| R10 | 5.498 | d10 | 0.374 | | | |

TABLE 10-continued

| | R | | d | | nd | | vd |
|---|---|---|---|---|---|---|---|
| R11 | 4.314 | d11 | 2.420 | nd6 | 1.5370 | v6 | 55.98 |
| R12 | −2.396 | d12 | 0.719 | | | | |
| R15 | ∞ | d13 | 0.300 | ndg1 | 1.5233 | vg1 | 54.52 |
| R16 | ∞ | d14 | 0.356 | | | | |
| R17 | ∞ | d15 | 0.400 | ndg2 | 1.5168 | vg2 | 64.17 |
| R18 | ∞ | d16 | 1.739 | | | | |

Table 11 illustrates the aspheric data for each lens in the optical camera lens 40 according to the fourth embodiment of the present application.

TABLE 11

| | Cone Coefficient | Aspheric Coefficient | | | |
|---|---|---|---|---|---|
| | k | A4 | A6 | A8 | A10 |
| R1 | / | / | / | / | / |
| R2 | / | / | / | / | / |
| R3 | −3.44499E+01 | 1.16460E−02 | −3.91420E−03 | 7.82740E−04 | −1.05070E−04 |
| R4 | −1.22497E−01 | 3.17930E−02 | −5.90140E−03 | −6.80010E−03 | 6.75550E−03 |
| R5 | / | / | / | / | / |
| R6 | / | / | / | / | / |
| R7 | 9.04255E+00 | 1.07600E−03 | −9.22240E−03 | −1.88390E−03 | 2.47860E−02 |
| R8 | −2.85601E+00 | −3.51990E−01 | 8.63970E−01 | −2.16490E+00 | 4.35450E+00 |
| R9 | −2.85601E+00 | −3.51990E−01 | 8.63970E−01 | −2.16490E+00 | 4.35450E+00 |
| R10 | −8.16830E+01 | −3.15730E−02 | 6.89500E−02 | −6.93030E−02 | 4.87660E−020 |
| R11 | −1.41857E+01 | −3.92900E−02 | 2.33520E−02 | −1.53460E−02 | 7.07630E−03 |
| R12 | −9.21509E−01 | −1.01730E−03 | −5.57530E−03 | 3.77640E−03 | −1.78840E−03 |

| | Aspheric Coefficient | | | | |
|---|---|---|---|---|---|
| | A12 | A14 | A16 | A18 | A20 |
| R1 | / | / | / | / | / |
| R2 | / | / | / | / | / |
| R3 | 9.48710E−06 | −5.61250E−07 | 2.05800E−08 | −4.17830E−10 | 3.52260E−12 |
| R4 | −3.45280E−03 | 1.09900E−03 | −2.17540E−04 | 2.44130E−05 | −1.19410E−06 |
| R5 | / | / | / | / | / |
| R6 | / | / | / | / | / |
| R7 | −3.24920E−02 | 1.84730E−02 | −6.21100E−03 | 1.76920E−03 | −2.30430E−04 |
| R8 | −6.10560E+00 | 5.56710E+00 | −3.13420E+00 | 9.87170E−01 | −1.33090E−01 |
| R9 | −6.10560E+00 | 5.56710E+00 | −3.13420E+00 | 9.87170E−01 | −1.33090E−01 |
| R10 | −2.25490E−02 | 6.60490E−03 | −1.15740E−03 | 1.10970E−04 | −5.58000E−06 |
| R11 | −2.07470E−03 | 3.98480E−04 | −4.71910E−05 | 3.08120E−06 | −1.09790E−07 |
| R12 | 4.93050E−04 | −7.93310E−05 | 6.76680E−06 | −2.51290E−07 | 3.29600E−09 |

Table 12 shows the design data of the inflection point of each lens in the optical camera lens 40 according to the fourth embodiment of the present application.

TABLE 12

| | Number of Inflection Points | Position of Inflection Point 1 | Position of Inflection Point 2 |
|---|---|---|---|
| P1R1 | / | / | / |
| PIR2 | / | / | / |
| P2R1 | 2 | 1.025 | 1.725 |
| P2R2 | / | / | / |
| P3R1 | / | / | / |
| P3R2 | / | / | / |
| P4R1 | / | / | / |
| P4R2 | / | / | / |
| P5R1 | / | / | 1 |
| P5R2 | 1 | 1.565 | / |
| P6R1 | 2 | 0.745 | 1.565 |
| P6R2 | / | / | / |

Figure 14:
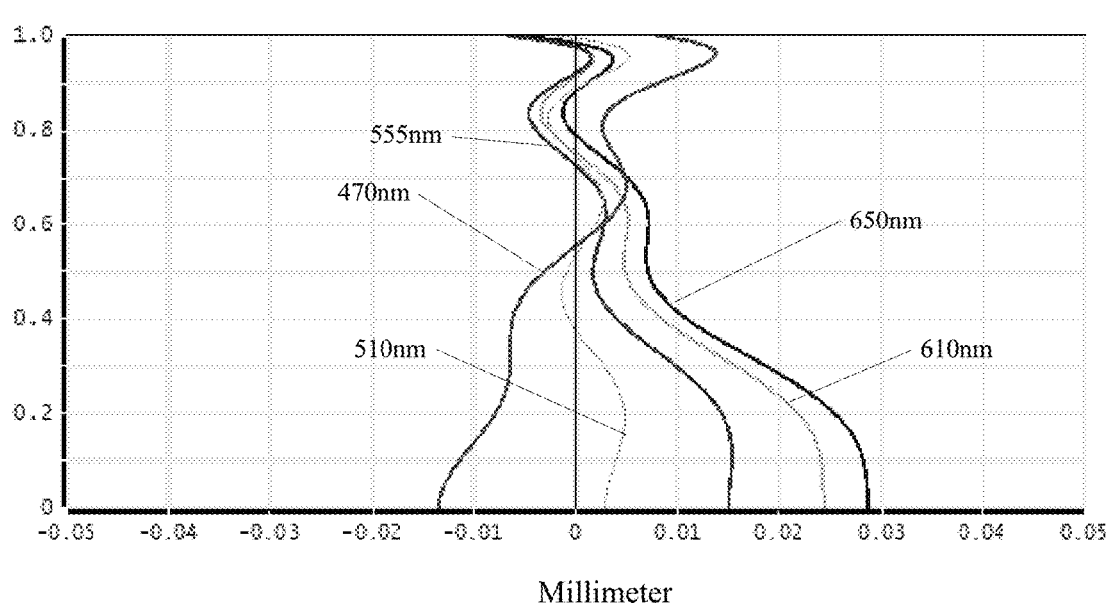
FIG. 14 is a schematic diagram showing the axial aberration of the optical camera lens shown in FIG. 13.
Figure 15:
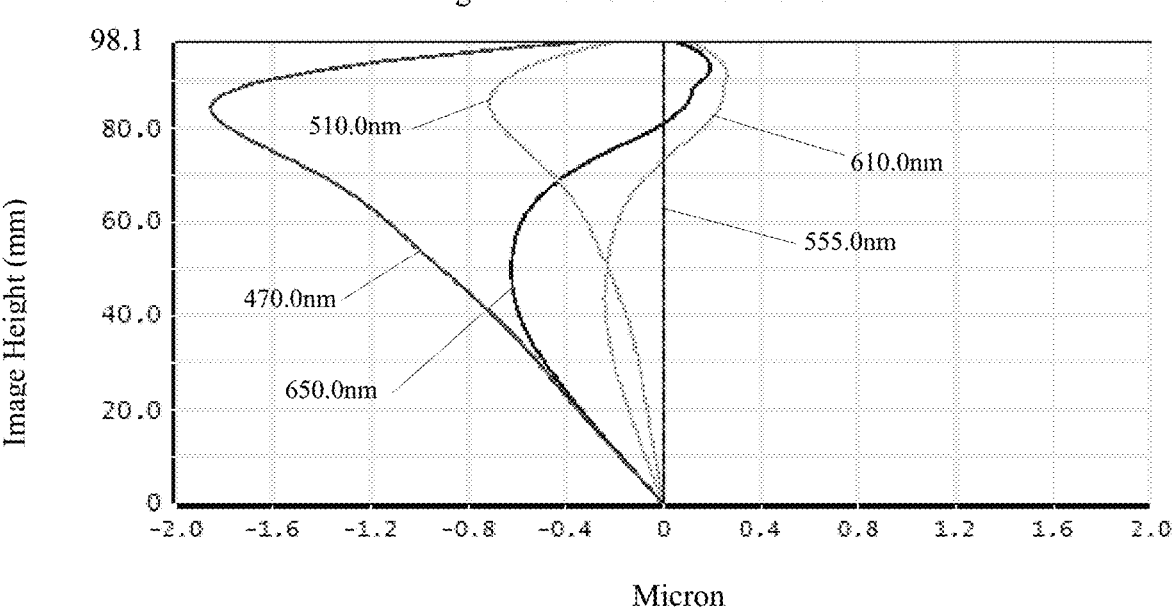
FIG. 15 is a schematic diagram showing the magnification chromatic aberration of the optical camera lens shown in FIG. 13.
Figure 16:
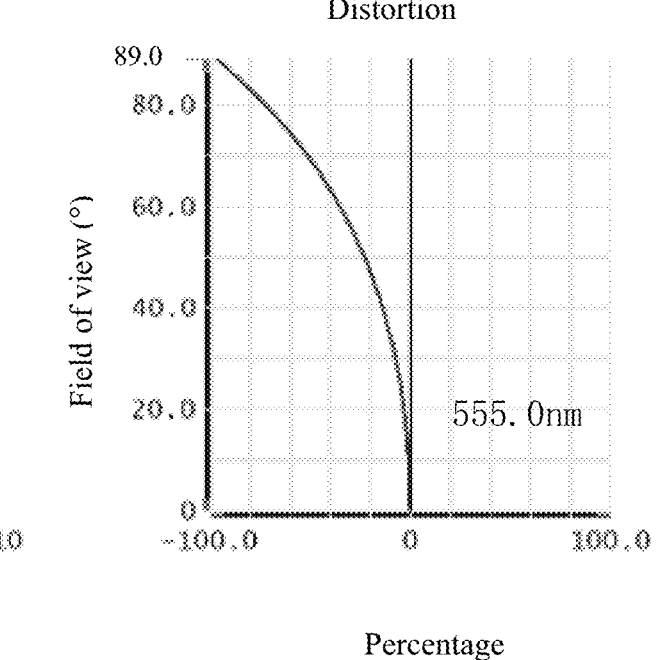
FIG. 16 is a schematic diagram showing the field curvature and distortion of the optical camera lens shown in FIG. 13.

FIGS. 14 and 15 are schematic diagrams showing the axial aberration and magnification chromatic aberration of light with wavelengths of 650 nm, 610 nm, 555 nm, 510 nm, and 470 nm, respectively, after passing through the optical camera lens 40 according to the fourth embodiment. FIG. 16 is a schematic diagram showing the field curvature and distortion of light with a wavelength of 550 nm after passing through the optical camera lens 40 according to the fourth embodiment. The field curvature S of FIG. 16 is the field curvature in the arc-sagittal direction, and T is the field curvature in the meridional direction.

Table 19 in the following lists the values corresponding to each of the relationship expressions in this embodiment in accordance with the above relationship expressions. It is clear that the optical camera lens 40 of this embodiment satisfies the above-described relationship expressions.

In this embodiment, the optical camera lens 40 has an Entrance Pupil Diameter (ENPD) of 0.616 mm, a full field-of-view image height (IH) of 2.428 mm, a field of view (FOV) of 196.00° in the diagonal direction, and an aperture value Fno of 2.00. The optical camera lens 40 satisfies the design requirements of large aperture and ultra-wide angle.

Fifth Embodiment

Figure 17:
FIG. 17 is a structural schematic diagram of the optical camera lens according to the fifth embodiment of the present application.
Figure 17:
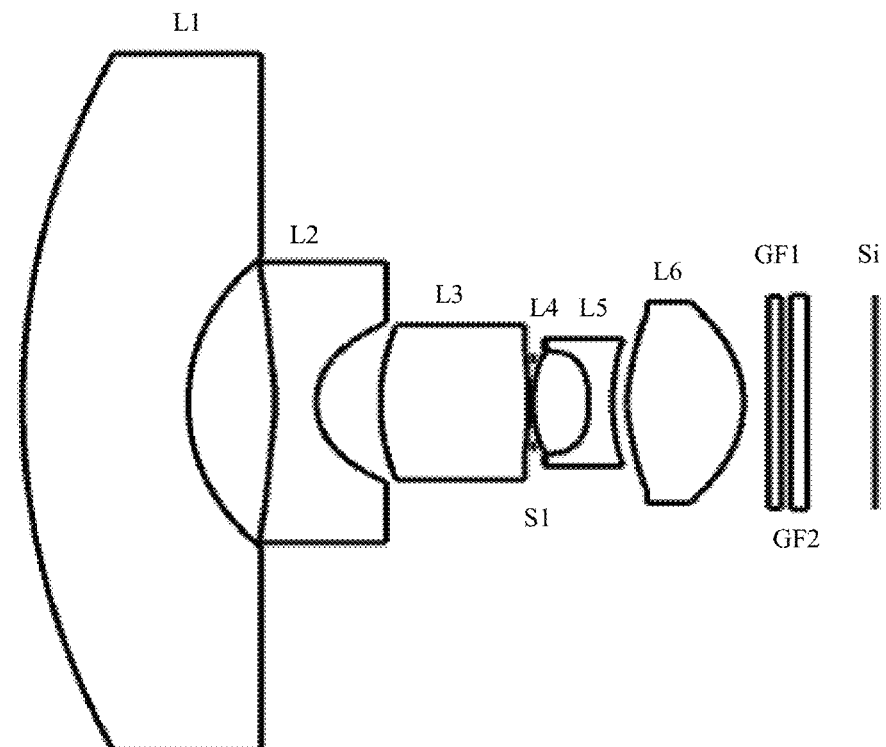

The fifth embodiment is basically the same as the first embodiment, and the meaning of the symbols is the same as that of the first embodiment. The structural form of the optical camera lens 50 according to the fifth embodiment is shown in FIG. 17, and only the differences are listed below.

Tables 13 and 14 show the design data of the optical camera lens 50 according to the fifth embodiment of the present application.

TABLE 13

| | R | | d | | nd | | vd |
|---|---|---|---|---|---|---|---|
| S1 | ∞ | d0 | −12.049 | | / | | / |
| R1 | 21.174 | d1 | 3.909 | nd1 | 1.8348 | v1 | 42.73 |
| R2 | 5.206 | d2 | 2.050 | | | | |
| R3 | −5.677 | d3 | 0.983 | nd2 | 1.5370 | v2 | 55.98 |
| R4 | 2.159 | d4 | 1.513 | | | | |
| R5 | 5.937 | d5 | 3.491 | nd3 | 1.9229 | v3 | 20.88 |
| R6 | −11.455 | d6 | 0.118 | | | | |
| R7 | 4.344 | d7 | 1.313 | nd4 | 1.5370 | v4 | 55.98 |
| R8 | −6.501 | d8 | 0.000 | | | | |
| R9 | −6.501 | d9 | 0.555 | nd5 | 1.6610 | v5 | 20.53 |
| R10 | 4.292 | d10 | 0.348 | | | | |
| R11 | 3.251 | d11 | 2.752 | nd6 | 1.5370 | v6 | 55.98 |
| R12 | −2.985 | d12 | 0.587 | | | | |
| R15 | ∞ | d13 | 0.300 | ndg1 | 1.5233 | vg1 | 54.52 |
| R16 | ∞ | d14 | 0.216 | | | | |
| R17 | ∞ | d15 | 0.400 | ndg2 | 1.5168 | vg2 | 64.17 |
| R18 | ∞ | d16 | 1.598 | | | | |

Table 14 illustrates the aspheric data for each lens in the optical camera lens 50 according to the fifth embodiment of the present application.

TABLE 14

| | Cone Coefficient | Aspheric Coefficient | | | |
|---|---|---|---|---|---|
| | k | A4 | A6 | A8 | A10 |
| R1 | / | / | / | / | / |
| R2 | / | / | / | / | / |
| R3 | −2.77075E+01 | 1.24210E−02 | −3.97650E−03 | 7.81960E−04 | −1.04920E−04 |
| R4 | −2.54102E−01 | 3.50040E−02 | −3.64640E−03 | −6.69890E−03 | 6.71390E−03 |
| R5 | / | / | / | / | / |
| R6 | / | / | / | / | / |
| R7 | 9.26470E+00 | −2.77740E−03 | 2.06560E−03 | −1.58860E−02 | 2.68540E−02 |
| R8 | 1.25752E+01 | −3.28750E−01 | 8.21430E−01 | −2.16920E+00 | 4.37130E+00 |
| R9 | 1.25752E+01 | −3.28750E−01 | 8.21430E−01 | −2.16920E+00 | 4.37130E+00 |
| R10 | −3.41145E+01 | −3.39360E−02 | 6.94430E−02 | −6.98850E−02 | 4.88070E−02 |
| R11 | −9.44475E+00 | −2.90600E−02 | 2.47690E−02 | −1.56800E−02 | 7.00940E−03 |
| R12 | −2.34205E+00 | −3.22000E−03 | −4.76900E−03 | 3.90770E−03 | −1.81230E−03 |

| | Aspheric Coefficient | | | | |
|---|---|---|---|---|---|
| | A12 | A14 | A16 | A18 | A20 |
| R1 | / | / | / | / | / |
| R2 | / | / | / | / | / |
| R3 | 9.49360E−06 | −5.61250E−07 | 2.05570E−08 | −4.20150E−10 | 3.64400E−12 |
| R4 | −3.46140E−03 | 1.09940E−03 | −2.16970E−04 | 2.45220E−05 | −1.22310E−06 |
| R5 | / | / | / | / | / |
| R6 | / | / | / | / | / |
| R7 | −2.96970E−02 | 1.89100E−02 | −6.90510E−03 | 1.23580E−03 | −1.01270E−04 |
| R8 | −6.10600E+00 | 5.56420E+00 | −3.13480E+00 | 9.87590E−01 | −1.33020E−01 |
| R9 | −6.10600E+00 | 5.56420E+00 | −3.13480E+00 | 9.87590E−01 | −1.33020E−01 |
| R10 | −2.25000E−02 | 6.60490E−03 | −1.16360E−03 | 1.09670E−04 | −4.30330E−06 |
| R11 | −2.07790E−03 | 3.98630E−04 | −4.71460E−05 | 3.10220E−06 | −8.66560E−08 |
| R12 | 4.94090E−04 | −7.86190E−05 | 6.81710E−06 | −2.61480E−07 | 1.72860E−09 |

Table 15 illustrates the design data of the inflection point of each lens in the optical camera lens 50 according to the fifth embodiment of the present application.

TABLE 15

| | Number of Inflection Points | Position of Inflection Point 1 | Position of Inflection Point 2 |
|---|---|---|---|
| P1R1 | / | / | / |
| P1R2 | / | / | / |
| P2R1 | / | / | / |
| P2R2 | 2 | 1.065 | 1.825 |
| P3R1 | / | / | / |

TABLE 15-continued

| | Number of Inflection Points | Position of Inflection Point 1 | Position of Inflection Point 2 |
|---|---|---|---|
| P3R2 | / | / | / |
| P4R1 | / | / | / |
| P4R2 | / | / | / |
| P5R1 | / | / | / |
| P5R2 | / | / | / |
| P6R1 | / | / | / |
| P6R2 | 1 | 2.415 | / |

Figure 18:
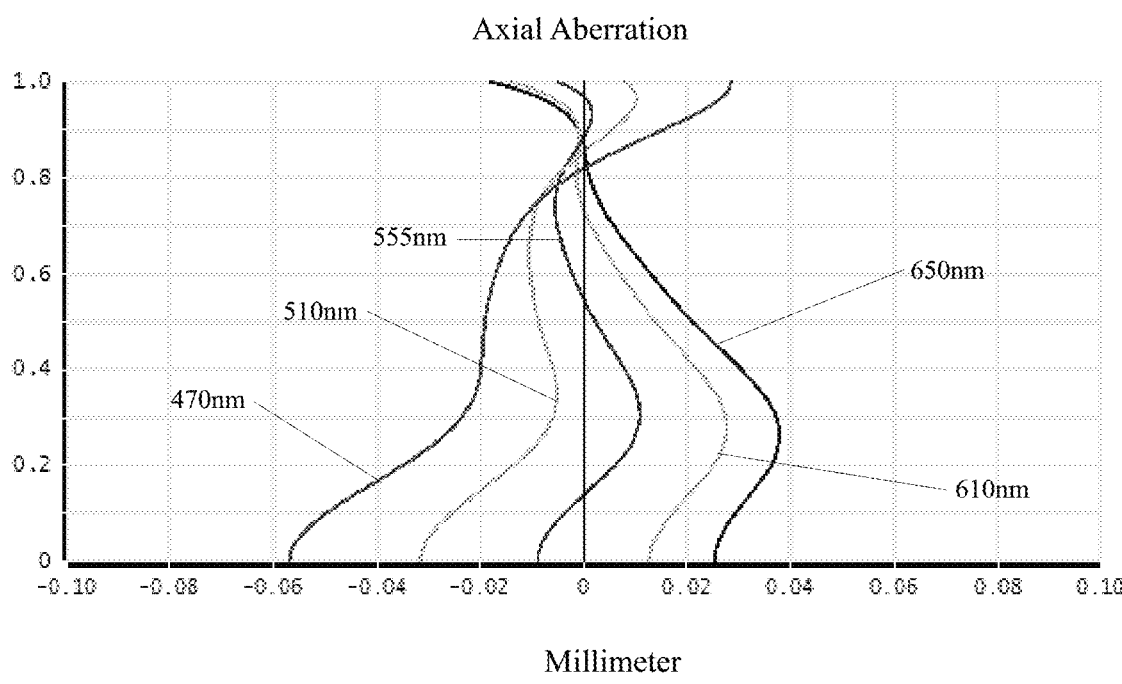
FIG. 18 is a schematic diagram showing the axial aberration of the optical camera lens shown in FIG. 17.
Figure 19:
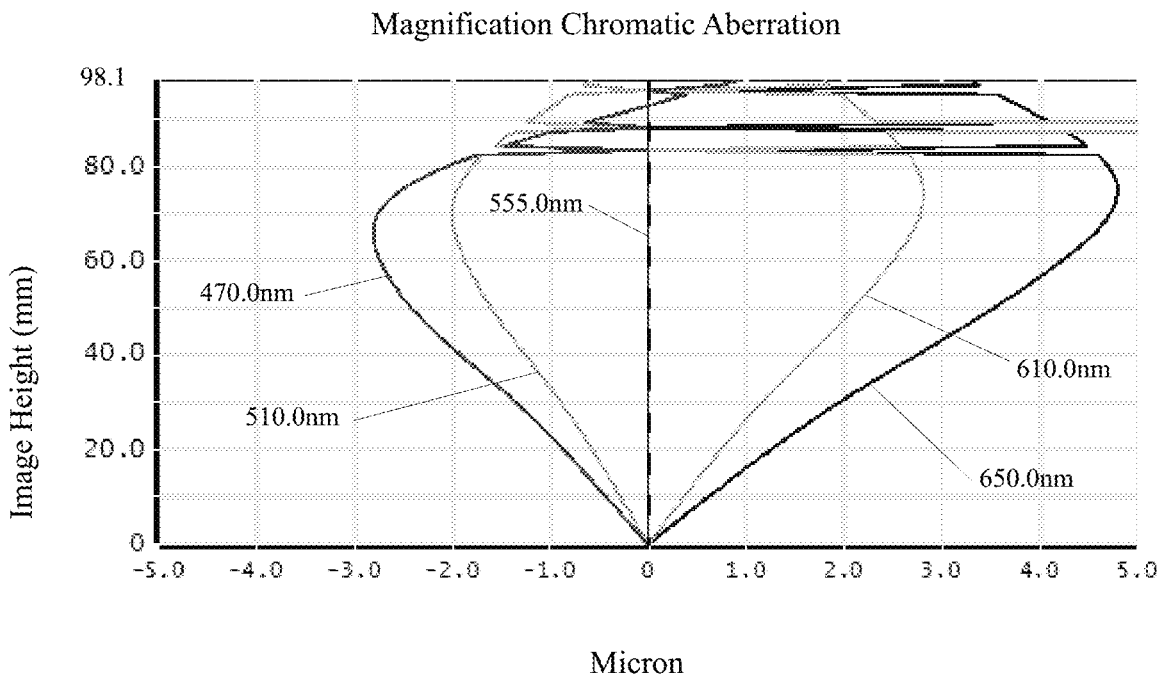
FIG. 19 is a schematic diagram showing the magnification chromatic aberration of the optical camera lens shown in FIG. 17.
Figure 20:
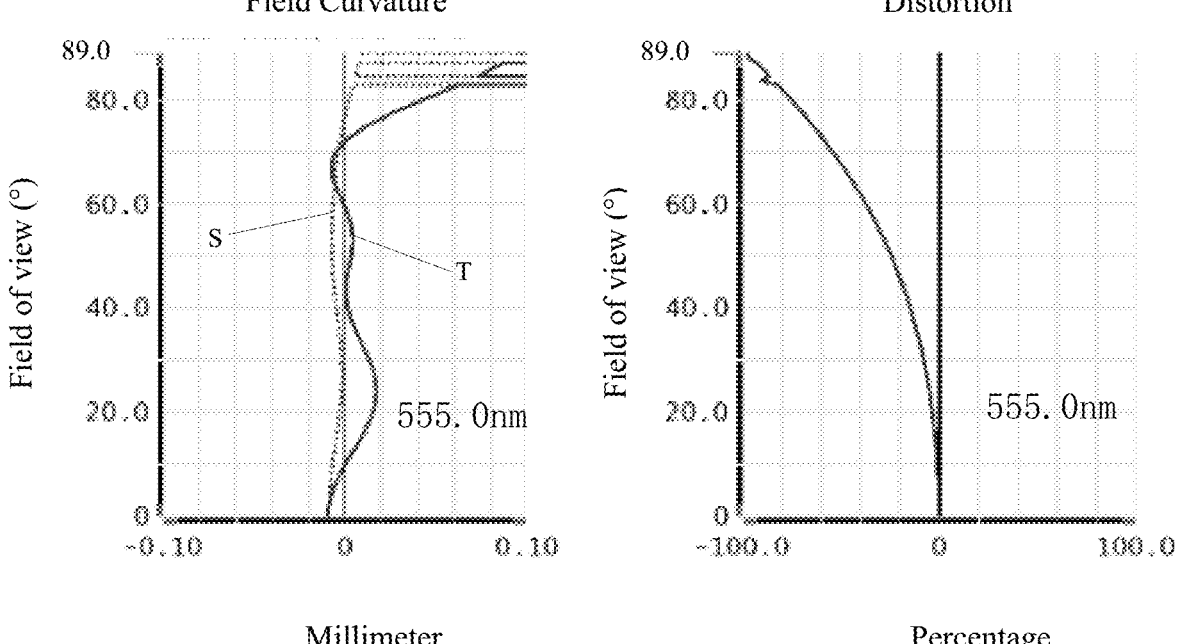
FIG. 20 is a schematic diagram showing the field curvature and distortion of the optical camera lens shown in FIG. 17.

FIGS. 18 and 19 are schematic diagrams showing the axial aberration and magnification chromatic aberration of light with wavelengths of 650 nm, 610 nm, 555 nm, 510 nm, and 470 nm, respectively, after passing through the optical camera lens 50 according to the fifth embodiment. FIG. 20 is a schematic diagram showing the field curvature and distortion of light with a wavelength of 550 nm after passing through the optical camera lens 50 according to the fifth embodiment. The field curvature S of FIG. 20 is the field curvature in the arc-sagittal direction, and T is the field curvature in the meridional direction.

Table 19 in the following lists the values corresponding to each of the relationship expressions in this embodiment in accordance with the above relationship expressions. It is clear that the optical camera lens 50 of this embodiment satisfies the above-described relationship expressions.

In this embodiment, the optical camera lens 50 has an Entrance Pupil Diameter (ENPD) of 0.867 mm, a full field-of-view image height (IH) of 2.771 mm, a field of view (FOV) of 196.00° in the diagonal direction, and an aperture value Fno of 2.00. The optical camera lens 50 satisfies the design requirements of large aperture and ultra-wide angle.

Comparison Embodiment

Figure 21:
FIG. 21 is a structural schematic diagram of the optical camera lens according to the comparison embodiment of the present application.
Figure 21:
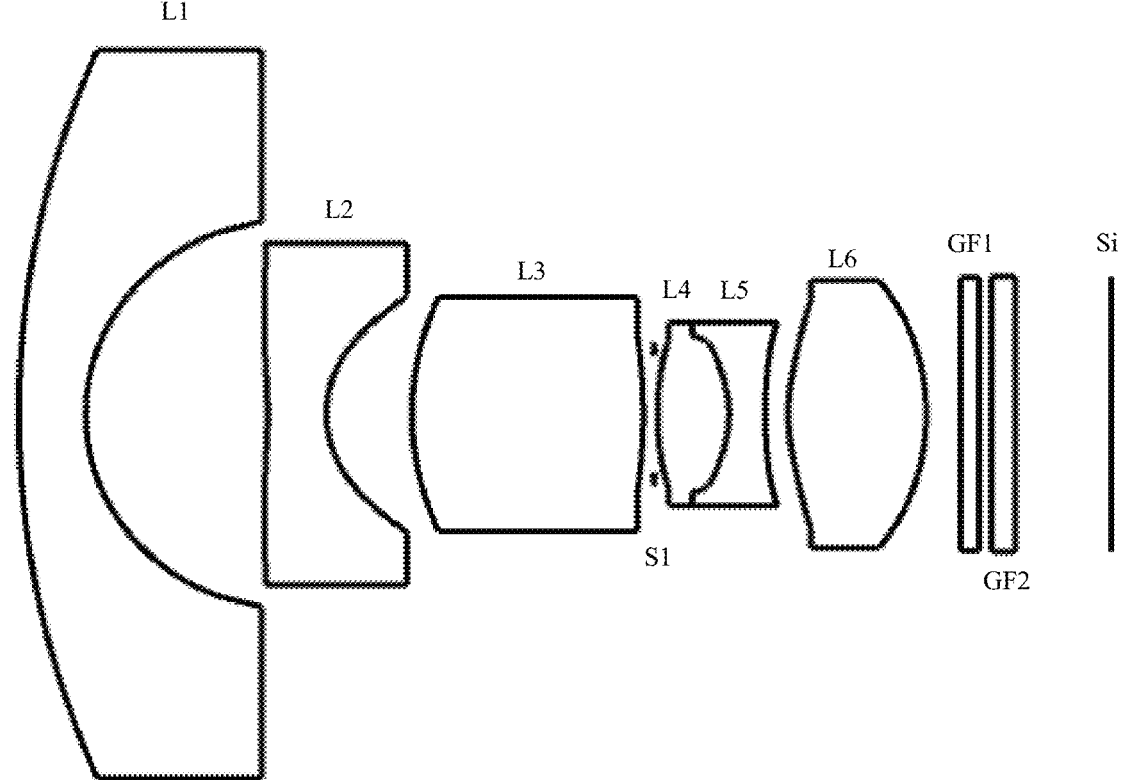

FIG. 21 shows the optical camera lens 60 according to the comparison embodiment.

Tables 16 and 17 show the design data of the optical camera lens 60 of the comparison embodiment of the present application.

TABLE 16

| | R | | d | | nd | | vd |
|---|---|---|---|---|---|---|---|
| S1 | ∞ | d0 | −10.459 | | / | | / |
| R1 | 16.203 | d1 | 1.100 | nd1 | 1.6667 | v1 | 48.43 |
| R2 | 3.392 | d2 | 2.997 | | | | |
| R3 | −7.770 | d3 | 0.971 | nd2 | 1.5370 | v2 | 55.98 |
| R4 | 2.044 | d4 | 1.410 | | | | |
| R5 | 4.983 | d5 | 3.808 | nd3 | 1.9176 | v3 | 21.51 |
| R6 | −9.770 | d6 | 0.237 | | | | |
| R7 | 5.203 | d7 | 1.174 | nd4 | 1.5370 | v4 | 55.98 |
| R8 | −2.421 | d8 | 0.000 | | | | |
| R9 | −2.421 | d9 | 0.600 | nd5 | 1.6610 | v5 | 20.53 |
| R10 | 6.731 | d10 | 0.379 | | | | |
| R11 | 3.013 | d11 | 2.275 | nd6 | 1.5370 | v6 | 55.98 |
| R12 | −4.048 | d12 | 0.570 | | | | |
| R15 | ∞ | d13 | 0.300 | ndg1 | 1.5233 | vg1 | 54.52 |
| R16 | ∞ | d14 | 0.200 | | | | |
| R17 | ∞ | d15 | 0.400 | ndg2 | 1.5168 | vg2 | 64.17 |
| R18 | ∞ | d16 | 1.581 | | | | |

TABLE 17

| | Cone Coefficient | Aspheric Coefficient | | | |
|---|---|---|---|---|---|
| | k | A4 | A6 | A8 | A10 |
| R1 | / | / | / | / | / |
| R2 | / | / | 1 | / | / |
| R3 | −1.28645E+02 | 1.31770E−02 | −3.99340E−03 | 7.80900E−04 | −1.04880E−04 |
| R4 | −3.70811E−01 | 2.76030E−02 | −5.26440E−03 | −6.71970E−03 | 6.74010E−03 |
| R5 | / | / | / | / | / |
| R6 | / | / | / | / | / |
| R7 | 9.04433E+00 | −2.48830E−03 | 2.67180E−03 | −1.56080E−02 | 2.70200E−02 |
| R8 | −7.68400E+00 | −2.57210E−01 | 8.28550E−01 | −2.16760E+00 | 4.37120E+00 |
| R9 | −7.68400E+00 | −2.57210E−01 | 8.28550E−01 | −2.16760E+00 | 4.37120E+00 |
| R10 | −4.30501E+01 | −3.11010E−02 | 6.99270E−02 | −6.99160E−02 | 4.87840E−20 |
| R11 | −8.31367E+00 | −2.88000E−02 | 2.47890E−02 | −1.56860E−02 | 7.00830E−03 |
| R12 | −3.40356E+00 | −3.40040E−03 | −4.93330E−03 | 3.89520E−03 | −1.81300E−03 |

| | Aspheric Coefficient | | | | |
|---|---|---|---|---|---|
| | A12 | A14 | A16 | A18 | A20 |
| R1 | / | / | / | / | / |
| R2 | / | / | / | / | / |
| R3 | 9.50380E−06 | −5.60870E−07 | 2.05230E−08 | −4.34410E−10 | 7.07520E−13 |
| R4 | −3.45500E−03 | 1.09960E−03 | −2.17160E−04 | 2.44640E−05 | −1.22200E−06 |
| R5 | / | / | / | / | / |
| R6 | / | / | / | / | / |
| R7 | −2.95700E−02 | 1.90010E−02 | −6.86670E−03 | 1.28250E−03 | −4.80140E−05 |
| R8 | −6.10620E+00 | 5.56400E+00 | −3.13490E+00 | 19.87600E−01 | −1.32960E−01 |
| R9 | −6.10620E+00 | 5.56400E+00 | −3.13490E+00 | 9.87600E−01 | −1.32960E−01 |
| R10 | −2.25120E−02 | 6.60200E−03 | −1.16430E−01 | 1.09570E−04 | −4.33180E−06 |
| R11 | −2.07820E−03 | 3.98580E−04 | −4.71530E−05 | 3.10300E−06 | −8.55700E−08 |
| R12 | 4.94080E−04 | −7.86120E−05 | 6.82030E−06 | −2.60320E−07 | 2.03910E−09 |

Table 18 shows the design data of the inflection point of each lens in the optical camera lens 60 of the present application for the scale.

TABLE 18

| | Number of Inflection Points | Position of Inflection Point 1 | Position of Inflection Point 2 |
|---|---|---|---|
| P1R1 | / | / | / |
| PIR2 | / | / | / |
| P2R1 | 2 | 0.655 | 2.425 |
| P2R2 | 1 | 1.975 | / |
| P3R1 | / | / | / |
| P3R2 | / | / | / |
| P4R1 | | / | / |
| P4R2 | / | / | / |
| P5R1 | / | / | / |
| P5R2 | 1 | 1.585 | / |
| P6R1 | / | / | 1 |
| P6R2 | 1 | 2.285 | / |

Figure 22:
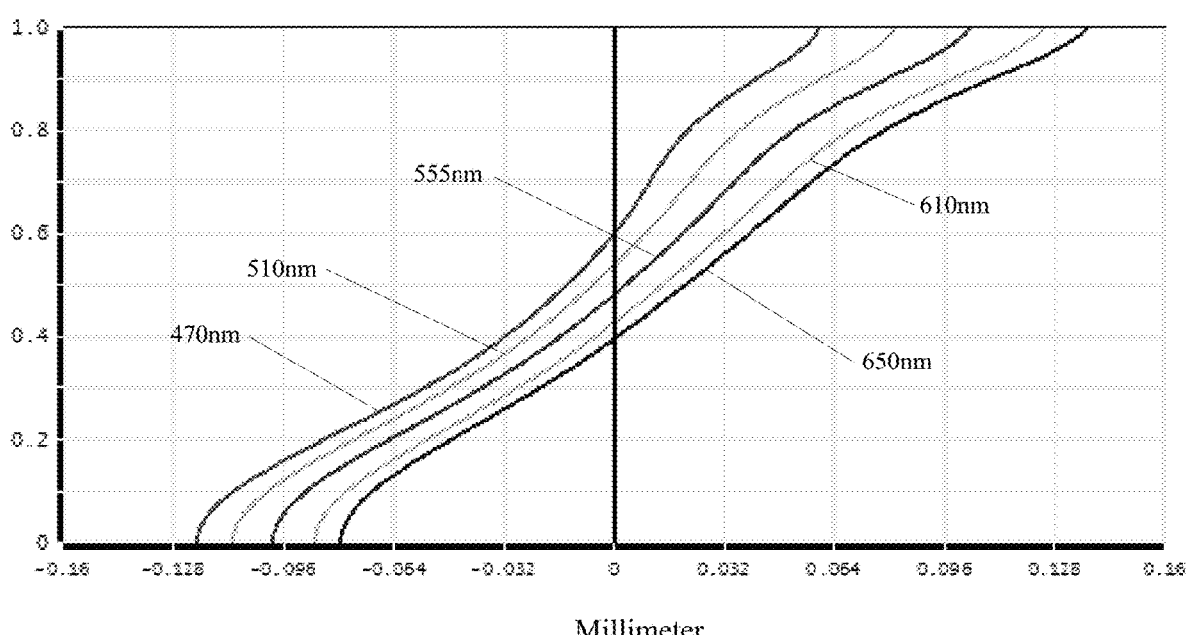
FIG. 22 is a schematic diagram showing the axial aberration of the optical camera lens shown in FIG. 21.
Figure 23:
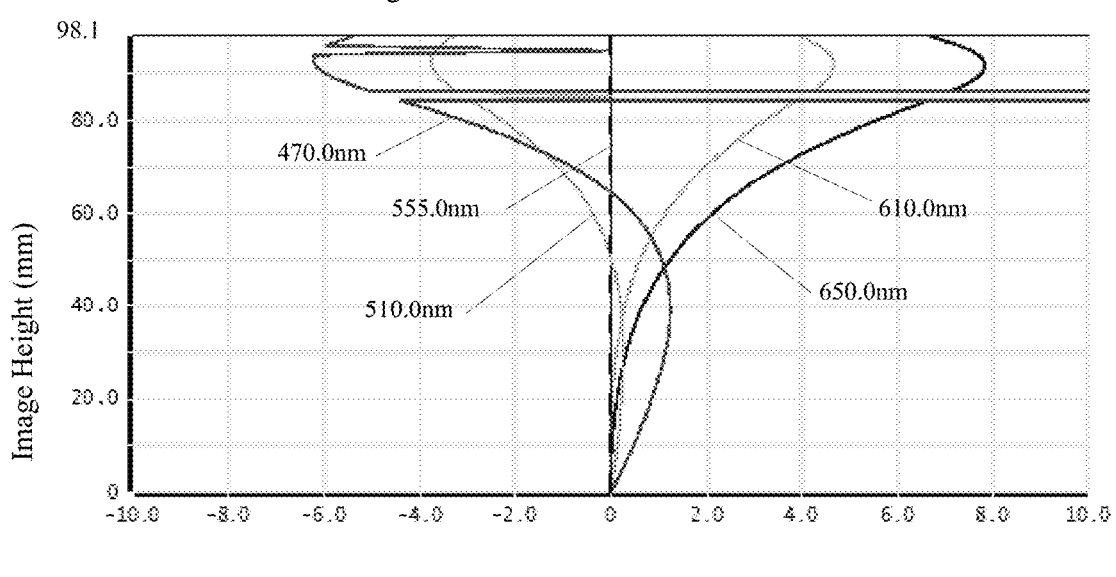
FIG. 23 is a schematic diagram showing the magnification chromatic aberration of the optical camera lens shown in FIG. 21.
Figure 24:
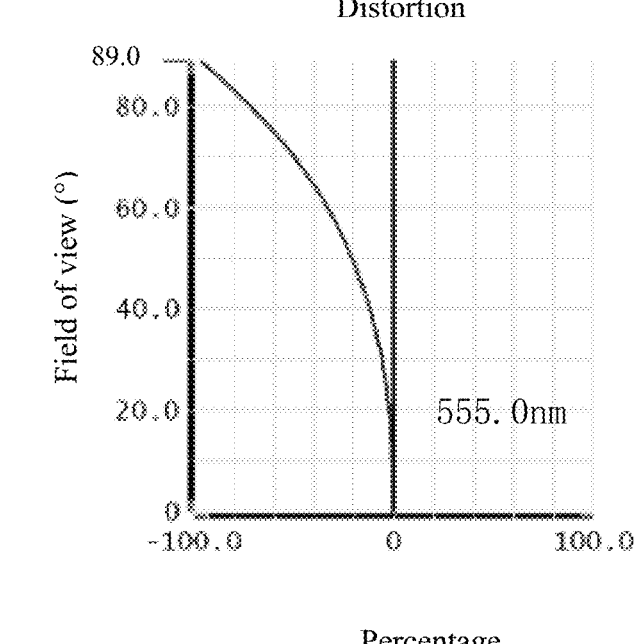
FIG. 24 is a schematic diagram showing the field curvature and distortion of the optical camera lens shown in FIG. 21.

FIGS. 22 and 23 are schematic diagrams showing the axial aberration and magnification chromatic aberration of light with wavelengths of 650 nm, 610 nm, 555 nm, 510 nm, and 470 nm, respectively, after passing through the optical camera lens 60 of the comparison embodiment. FIG. 24 is a schematic diagram showing the field curvature and distortion of light with a wavelength of 550 nm passing through the optical camera lens 60 of the comparison embodiment. The field curvature S of FIG. 24 is the field curvature in the arc-sagittal direction, and T is the field curvature in the meridional direction.

Table 19 in the following lists the values corresponding to each of the relationship expressions in this comparison embodiment in accordance with the above relationship expressions. It is clear that the optical camera lens 60 according to the comparison embodiment does not satisfy the above-described relationship expression 1.70≤n1≤2.20.

In this embodiment, the optical camera lens 60 has an Entrance Pupil Diameter (ENPD) of 0.724 mm, a full field-of-view image height (IH) of 2.863 mm, a field of view (FOV) of 196.00° in the diagonal direction, and an aperture value Fno of 2.00. Due to various types of aberration being not sufficiently compensated for, the optical camera lens 60 does not have excellent optical characteristics.

TABLE 19

| Parameters and relationship expressions | First Embodiment | Second Embodiment | Third Embodiment | Fourth Embodiment | Fifth Embodiment | Comparison Embodiment |
|---|---|---|---|---|---|---|
| n1 | 1.83 | 1.71 | 2.20 | 1.83 | 1.83 | 1.67 |
| f2/f | −2.06 | −2.28 | −2.23 | −2.25 | −1.61 | −2.00 |
| R11/R12 | −0.96 | −0.50 | −0.62 | −1.80 | −1.09 | −0.74 |
| f3/f4 | 0.21 | 0.23 | 0.10 | 0.33 | 0.49 | 0.22 |
| d5/d6 | 16.10 | 8.00 | 30.00 | 30.00 | 29.70 | 16.10 |
| f45/(d7 + d8 + d9) | −7.33 | −12.00 | −4.03 | −12.00 | −19.83 | −16.38 |
| n3 | 1.92 | 1.89 | 2.20 | 1.70 | 1.92 | 1.92 |
| f | 1.468 | 1.298 | 1.376 | 1.232 | 1.733 | 1.448 |
| f1 | −6.400 | −6.936 | −5.403 | −7.009 | −9.269 | −6.639 |
| f2 | −3.025 | −2.986 | −3.075 | −2.771 | −2.782 | −2.903 |
| f3 | 3.913 | 4.099 | 3.067 | 4.999 | 4.651 | 4.072 |
| f4 | 18.512 | 17.575 | 29.736 | 15.166 | 9.398 | 18.234 |
| f5 | −4.880 | −5.383 | −3.169 | −5.761 | −5.680 | −6.501 |
| f6 | 3.269 | 3.358 | 2.926 | 3.273 | 3.417 | 3.614 |
| f45 | −13.000 | −15.947 | −5.288 | −26.207 | −37.036 | −29.043 |
| Fno | 2.00 | 2.00 | 2.00 | 2.00 | 2.00 | 2.00 |
| TTL | 18.010 | 19.185 | 19.205 | 21.128 | 20.133 | 18.001 |
| IH | 2.883 | 2.299 | 2.188 | 2.428 | 2.771 | 2.863 |
| FOV | 196.00° | 196.00° | 196.00° | 196.00° | 196.00° | 196.00° |

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. An optical camera lens, comprising, in order from an objective side to an image side:

a first lens having a negative refractive force;

a second lens having a negative refractive force;

a third lens having a positive refractive force;

a fourth lens having a positive refractive force;

a fifth lens having a negative refractive force; and a sixth lens having a positive refractive force;

wherein a refractive index of the first lens is n1; a focal length of the optical camera lens is f; a focal length of the second lens is f2; a focal length of the third lens is f3; a focal length of the fourth lens is f4; a central radius of curvature of an objective surface of the sixth lens is R11; a central radius of curvature of an image surface of the sixth lens is R12; an on-axis thickness of the third lens is d5; an on-axis distance from an image surface of the third lens to an objective surface of the fourth lens is d6, and the following relationship expressions are satisfied:

$$1.70 \le n1 \le 2.20;$$

$$-2.30 \le f2/f \le -1.60;$$

$$-1.80 \le R11/R12 \le -0.50;$$

-continued $$0.10 \le f3/f4 \le 0.50;$$

$$8.00 \le d5/d6 \le 30.00.$$

2. The optical camera lens of claim 1, wherein a combined focal length of the fourth lens and the fifth lens is f45; an on-axis thickness of the fourth lens is d7; an on-axis distance from an image surface of the fourth lens to an objective surface of the fifth lens is d8; an on-axis thickness of the fifth lens is d9, and the following relationship expression is satisfied:

$$-20.00 \le f45/(d7 + d8 + d9) \le -4.00.$$

3. The optical camera lens of claim 1, wherein a refractive index of the third lens is n3, and the following relationship expression is satisfied:

$$1.70 \le n3 \le 2.20.$$

4. The optical camera lens of claim 1, wherein an objective surface of the first lens is convex at a proximal-axis position, and an image surface of the first lens is concave at a proximal-axis position;

a total track length of the optical camera lens is TTL; a focal length of the first lens is f1; a central radius of curvature of the objective surface of the first lens is R1; a central radius of curvature of the image surface of the first lens of R2; an on-axis thickness of the first lens is d1, and the following relationship expressions are satisfied:

$$-11.38 \le f1/f \le -2.62;$$

$$0.83 \le (R1 + R2)/(R1 - R2) \le 2.81;$$

$$0.03 \le d1/TTL \le 0.29.$$

5. The optical camera lens of claim 1, wherein an objective surface of the second lens is concave at a proximal-axis position, and an image surface of the second lens is concave at a proximal-axis position;

a total track length of the optical camera lens is TTL; a central radius of curvature of the objective surface of the second lens of R3; a central radius of curvature of the image surface of the second lens of R4; an on-axis thickness of the second lens is d3, and the following relationship expressions are satisfied:

$$0.04 \le (R3 + R4)/(R3 - R4) \le 0.92;$$

$$0.02 \le d3/TTL \le 0.08.$$

6. The optical camera lens of claim 1, wherein an objective surface of the third lens is convex at a proximal-axis position, and the image surface of the third lens is convex at a proximal-axis position;

a total track length of the optical camera lens is TTL; a central radius of curvature of the objective surface of the third lens is R5; a central radius of curvature of the image surface of the third lens is R6, and the following relationship expressions are satisfied:

$$1.11 \le f3/f \le 6.09;$$

$$-0.69 \le (R5 + R6)/(R5 - R6) \le -0.17;$$

$$0.09 \le d5/TTL \le 0.37.$$

7. The optical camera lens of claim 1, wherein the objective surface of the fourth lens is convex at a proximal-axis position, and an image surface of the fourth lens is convex at a proximal-axis position;

a total track length of the optical camera lens is TTL; a central radius of curvature of the objective surface of the fourth lens is R7; a central radius of curvature of the image surface of the fourth lens is R8; an on-axis thickness of the fourth lens is d7, and the following relationship expressions are satisfied:

$$2.71 \le f4/f \le 32.42;$$

-continued $$-0.40 \le (R7 + R8)/(R7 - R8) \le 0.58;$$

$$0.02 \le d7/TTL \le 0.13.$$

8. The optical camera lens of claim 1, wherein an objective surface of the fifth lens is concave at a proximal-axis position, and an image surface of the fifth lens is concave at a proximal-axis position;

a total track length of the optical camera lens is TTL; a focal length of the fifth lens is f5; a central radius of curvature of the objective surface of the fifth lens of R9; a central radius of curvature of the image surface of the fifth lens of R10; an on-axis thickness of the fifth lens is d9, and the following relationship expressions are satisfied:

$$-9.35 \le f5/f \le -1.54;$$

$$-0.74 \le (R9 + R10)/(R9 - R10) \le 0.31;$$

$$0.01 \le d9/TTL \le 0.06.$$

9. The optical camera lens of claim 1, wherein the objective surface of the sixth lens is convex at a proximal-axis position, and the image surface of the sixth lens is convex at a proximal-axis position;

a total track length of the optical camera lens is TTL; a focal length of the sixth lens is f6; an on-axis thickness of the sixth lens is d11, and the following relationship expressions are satisfied:

$$0.99 \le f6/f \le 3.98;$$

$$0.04 \le d11/TTL \le 0.21.$$

10. The optical camera lens of claim 1, wherein an aperture value of the optical camera lens is Fno; a field of view of the optical camera lens is FOV, and the following relationship expressions are satisfied:

$$Fno \le 2.00;$$

$$FOV \ge 196.00°.$$

11. The optical camera lens of claim 1, wherein the first lens is made of glass material.

12. The optical camera lens of claim 1, wherein the third lens is made of glass material.

\* \* \* \* \*